(12) United States Patent
Hakko et al.

(10) Patent No.: US 7,126,761 B2
(45) Date of Patent: Oct. 24, 2006

(54) ZOOM OPTICAL SYSTEM

(75) Inventors: Manabu Hakko, Utsunomiya (JP);
Koshi Hatakeyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/223,474

(22) Filed: Sep. 8, 2005

(65) Prior Publication Data
US 2006/0050407 A1    Mar. 9, 2006

(30) Foreign Application Priority Data
Sep. 8, 2004    (JP)    ............................. 2004-261719

(51) Int. Cl.
  *G02B 15/14*    (2006.01)
(52) U.S. Cl. ...................... 359/686; 359/679
(58) Field of Classification Search ................ 359/676,
  359/679, 686–688, 663, 739, 741
  See application file for complete search history.

(56) References Cited

U.S. PATENT DOCUMENTS

| | | | |
|---|---|---|---|
| 5,815,320 A * | 9/1998 | Hoshi et al. ................ | 359/686 |
| 5,825,560 A | 10/1998 | Ogura et al. ................ | 359/822 |
| 5,847,887 A | 12/1998 | Ogura et al. ................ | 359/822 |
| 6,021,004 A | 2/2000 | Sekita et al. ................ | 359/676 |
| 6,166,866 A | 12/2000 | Kimura et al. .............. | 359/729 |
| 6,292,309 B1 | 9/2001 | Sekita et al. ................ | 359/729 |
| 6,366,411 B1 | 4/2002 | Kimura et al. .............. | 359/729 |
| 6,522,475 B1 | 2/2003 | Akiyama et al. ........... | 359/676 |
| 6,606,200 B1 * | 8/2003 | Nakayama et al. ......... | 359/686 |

FOREIGN PATENT DOCUMENTS

| | | |
|---|---|---|
| JP | 08-292371 | 11/1996 |
| JP | 08-292372 | 11/1996 |
| JP | 09-005650 | 1/1997 |
| JP | 09-222561 | 8/1997 |
| JP | 2002-055279 | 2/2002 |
| JP | 2002-207167 | 7/2002 |

* cited by examiner

*Primary Examiner*—Scott J. Sugarman
*Assistant Examiner*—M. Hasan
(74) *Attorney, Agent, or Firm*—Morgan & Finnegan, L.L.P.

(57) ABSTRACT

A zoom optical system provided, in order from a reduction side toward a magnification side, with: a first lens unit having positive optical power; a second lens unit having positive optical power; a third lens unit having positive optical power; and a fourth lens unit having negative optical power; wherein the interval between adjacent ones of the first, second, third and fourth lens units is varied during zooming, and in an entire zooming range, a magnification side conjugate position relative to a reduction side conjugate position, and the position of the pupil of the zoom optical system relative to the reduction side conjugate position are substantially immovable.

23 Claims, 15 Drawing Sheets

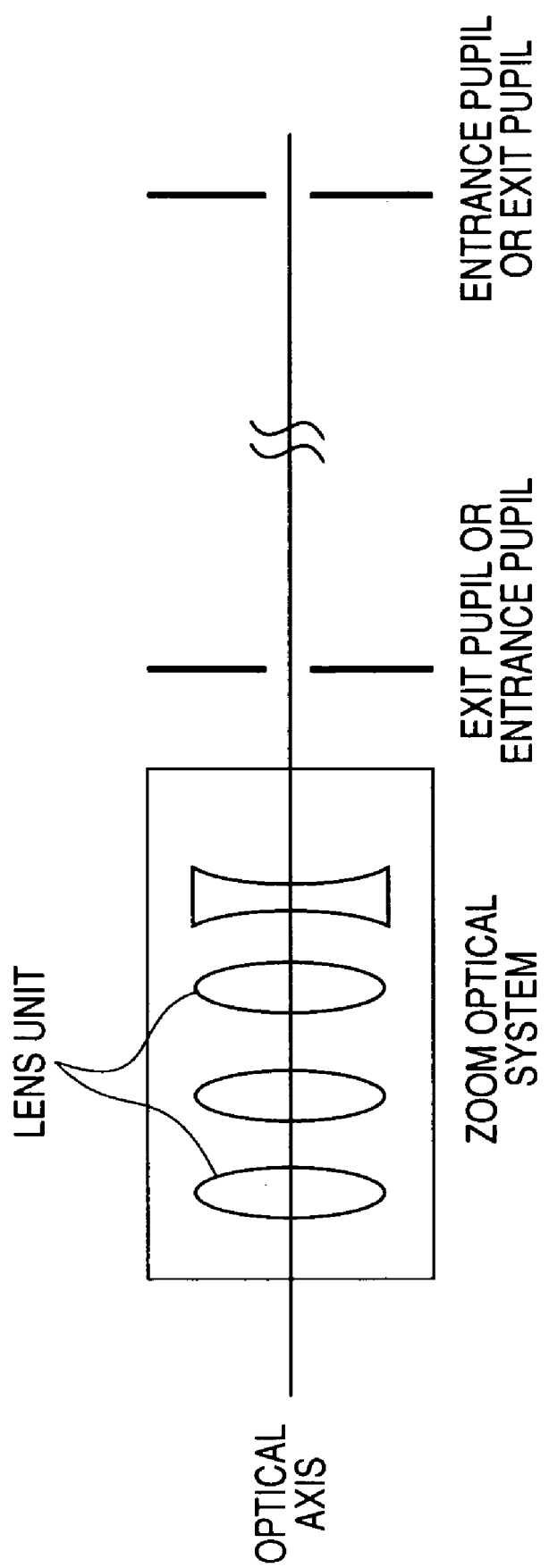

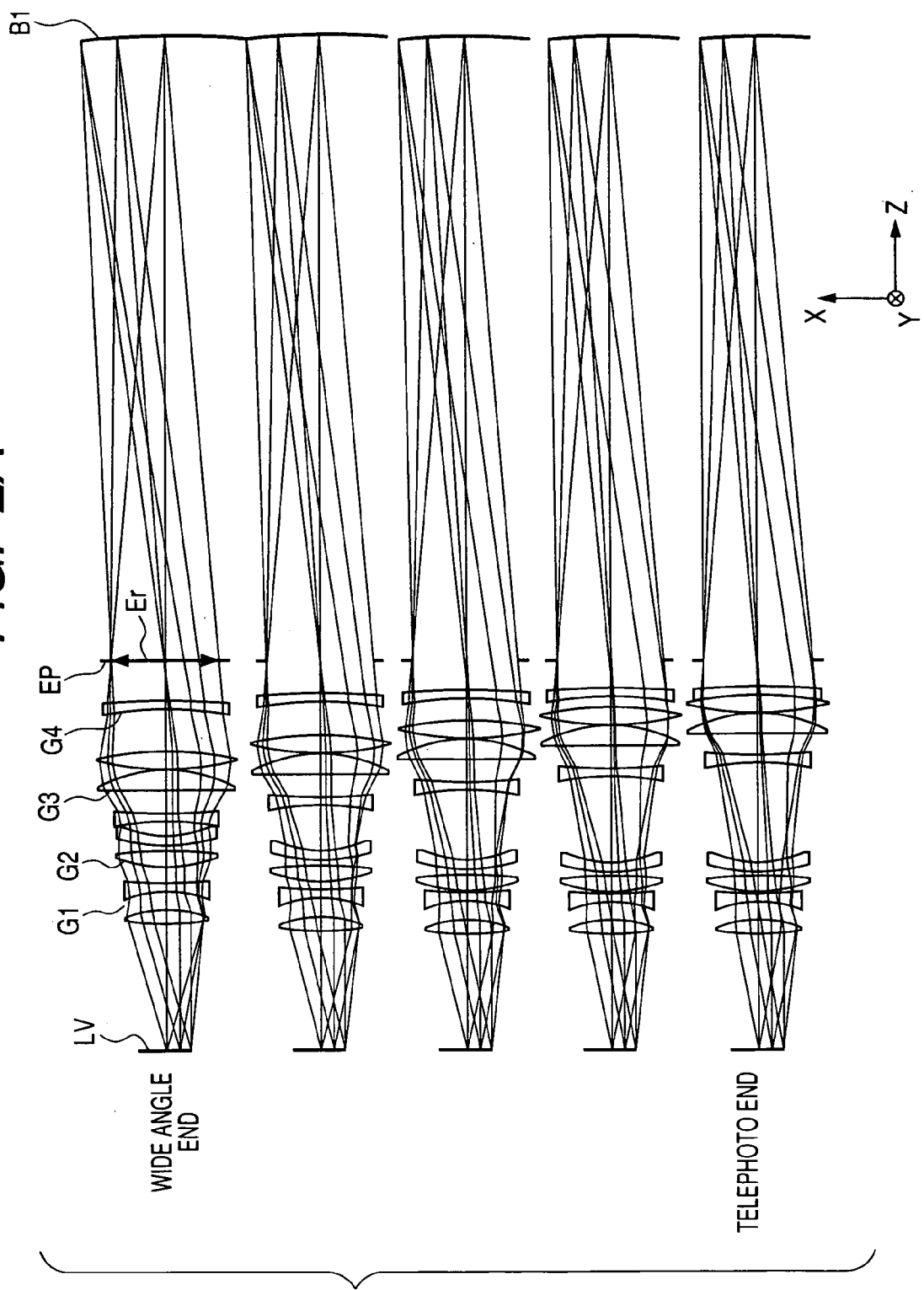

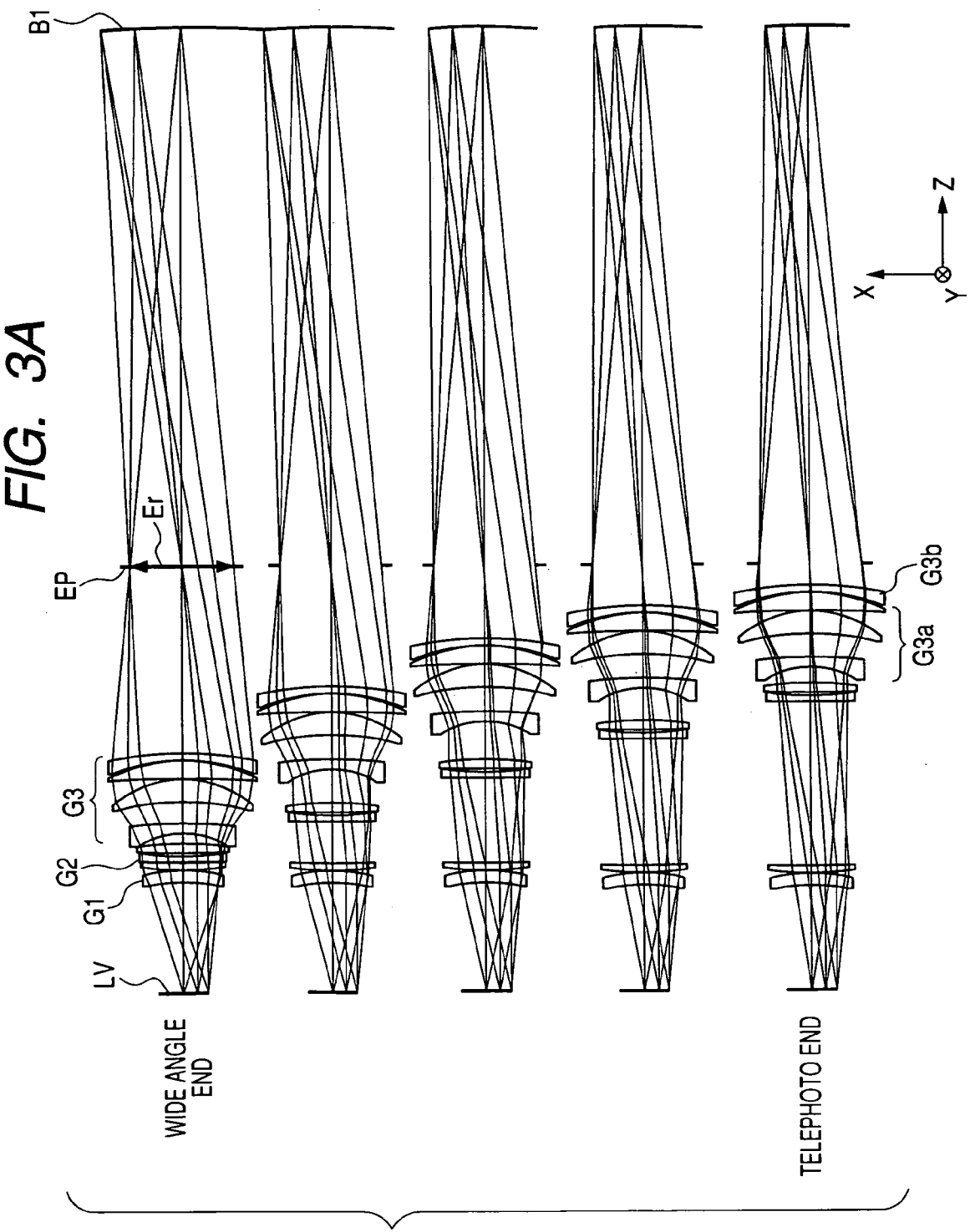

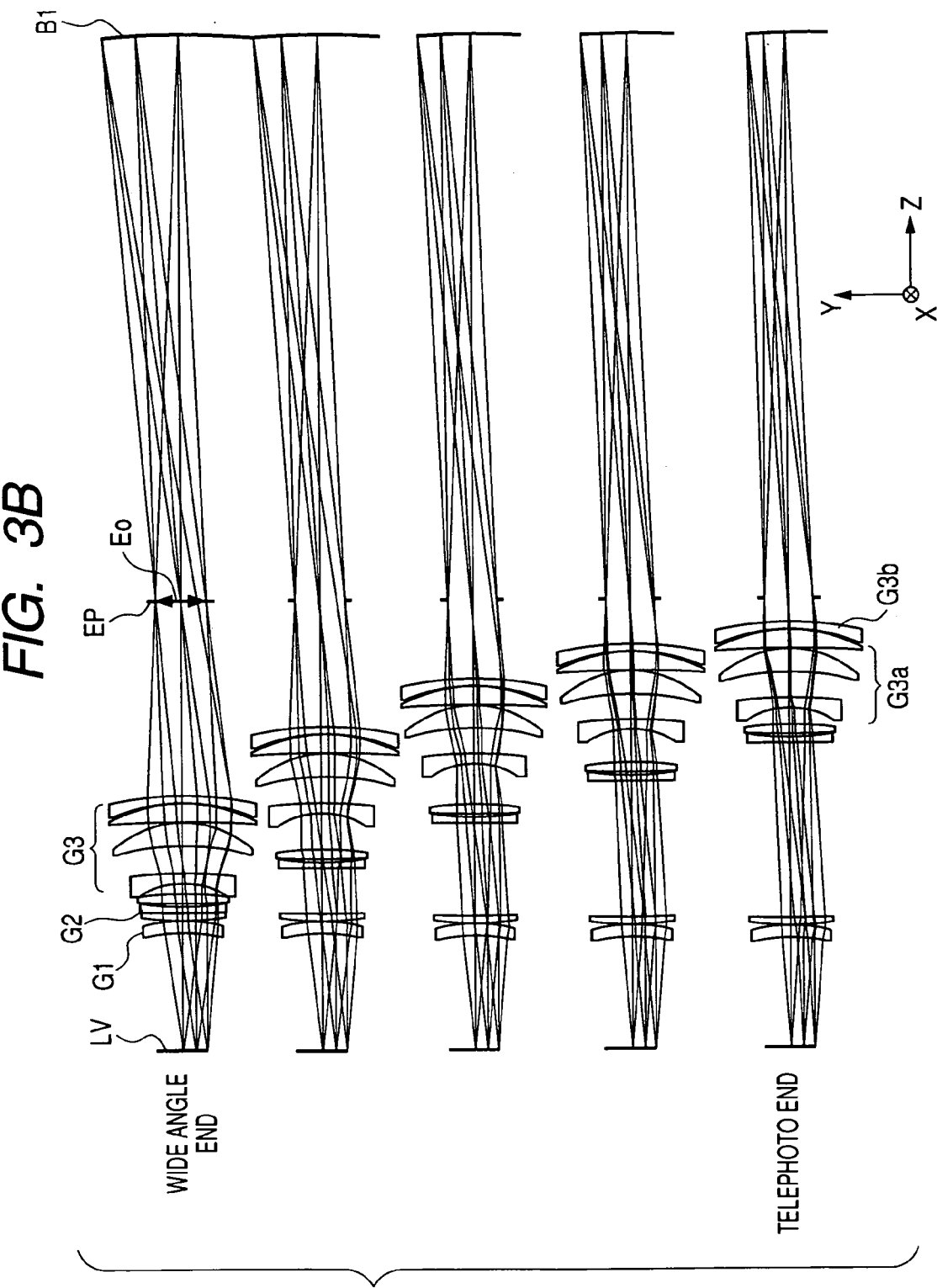

FIG. 13

| | p1 | p2 | p3 | p4 | p3+p4 |
|---|---|---|---|---|---|
| EMBODIMENT 1 | 0.00425898 | 0.0069046 | 0.0173388 | -0.00399992 | VARIABLE |
| EMBODIMENT 2 | 0.00937771 | 0.00713496 | 0.0147494 | (-0.00560619) | 0.00541896 |

| FOCAL LENGTH (f) | fw(74mm) | fm(92.5mm) | ft(111mm) |
|---|---|---|---|
| p1+p2 IN EMBODIMENT 1 | 0.0095939 | 0.009732 | 0.009773 |
| p2+p3 IN EMBODIMENT 1 | 0.0181407 | 0.015699 | 0.014252 |
| p3+p4 IN EMBODIMENT 1 | 0.0135022 | 0.012993 | 0.012359 |
| p1+p2 IN EMBODIMENT 2 | 0.0166002 | 0.013927 | 0.011459 |
| p2+p3+p4 IN EMBODIMENT 2 | 0.0091279 | 0.008605 | 0.009005 |

ZOOM OPTICAL SYSTEM

BACKGROUND OF THE INVENTION

1. Field of the Invention

This invention relates to a zoom optical system for use in an optical apparatus such as an image projecting apparatus or an exposing apparatus.

2. Related Background Art

Some of such optical apparatuses as mentioned above require a zoom optical system excellent in telecentricity on the object side, and excellent in the invariability of the positions of the object surface, the image plane and the exit pupil relative to the variation of the focal length.

For example, Japanese Patent Application Laid-open No. 2002-207167 discloses, as a zoom optical system suitable for an illuminating optical system mounted on a projection exposing apparatus, a zoom optical system in which as the focal length becomes shorter, a lens unit having negative refractive power or a lens unit including a lens element having strong negative refractive power is moved toward the object side, whereby the positions of the object surface, the image plane, the entrance pupil and the exit pupil are made immovable relative to the variation of the focal length.

Also, Japanese Patent Application Laid-open No. 2002-055279 discloses a zoom optical system suitable for a transmitting optical system in an illuminating optical system mounted on a projection exposing apparatus. This zoom optical system has at least four lens units, and at least three lens units are moved, whereby during zooming from the wide angle end to the telephoto end, the refractive power arrangement of positive, negative and positive in succession from the object side is approached from the refractive power arrangement of negative, positive and positive or positive, positive and negative in succession from the object side, whereby the positions of the object surface, the image plane, the entrance pupil and the exit pupil are made immovable relative to the variation of the focal length.

Now, it is also conceivable for the zoom optical system disclosed in Japanese Patent Application Laid-open No. 2002-207167 or Japanese Patent Application Laid-open No. 2002-055279 to be used in the projection optical system of an image projecting apparatus for enlarging and projecting the image of an original formed on a liquid crystal panel or a portion of the projection optical system.

However, when a liquid crystal panel is disposed on the reduction side focal plane of the zoom optical system of Japanese Patent Application Laid-open No. 2002-207167, the back focus cannot be sufficiently secured, and a space for disposing a color synthesizing member therein cannot be secured on the reduction side. In a so-called three-plate type image projecting apparatus, a color synthesizing member for synthesizing three red, green and blue color lights is disposed on the reduction side of the zoom optical system, but if as described above, the back focus cannot be sufficiently secured, it will become impossible to secure the space for disposing the color synthesizing member therein.

Also, in the zoom optical system disclosed in Japanese Patent Application Laid-open No. 2002-207167, the lens unit most adjacent to the reduction side has negative refractive power, and as the focal length becomes shorter, a lens unit having positive refractive power and disposed more adjacent to the magnification side than the negative lens unit is moved toward the magnification side, and the interval between the two lens units is increased. Therefore, the effective diameter of this positive lens unit becomes large. Further, since the lens unit most adjacent to the reduction side has negative refractive power, the numerical aperture (NA) of the reduction side becomes small.

In Japanese Patent Application Laid-open No. 2002-207167, there is also disclosed a case where the lens unit most adjacent to the reduction side is given positive refractive power, but as the focal length becomes shorter, this lens unit is greatly moved toward the magnification side and therefore, if the NA of the reduction side is made great, the effective diameter of this lens unit will become large.

That is, in this zoom optical system, in the state of a minimum focal length (wide), a plurality of lens units deviate toward an aperture stop side, and are moved toward the reduction side focal plane as the focal length becomes longer and therefore, the effective diameters of the lens units are liable to become large, and this is unsuitable for compactness. Further, the lens unit most adjacent to the magnification side has positive refractive power, and this is also unsuitable for securing a sufficient back focus. Moreover, this zoom optical system supposes the use of a light source of a single wavelength, and is not suited for the projection display of a color image.

Also, in the zoom optical system disclosed in Japanese Patent Application Laid-open No. 2002-055279, there is a case where the synthesized refractive power of adjacent lens units becomes negative, and the refractive power is small. Accordingly, the focal length is as great as at least 190 mm. This is because this zoom optical system is an optical system suited for an exposing apparatus, and this zoom optical system is unsuitable for the optical system of a projector or the like of which the downsizing and wider angle are desired. Also, this zoom optical system, like the zoom optical system disclosed in Japanese Patent Application Laid-open No. 2002-207167, supposes the use of a light source of a single wavelength and therefore, is not suited for the projection display of a color image.

SUMMARY OF THE INVENTION

According to one aspect of the present invention, a zoom optical system is provided, in order from a reduction side toward a magnification side, with a first lens unit having positive optical power; a second lens unit having positive optical power; a third lens unit having positive optical power; and a fourth lens unit having negative optical power; wherein the interval between adjacent ones of said first, second, third and fourth lens units is varied during zooming, and in an entire zooming range, the magnification side conjugate position relative to the reduction side conjugate position, and the position of the pupil of the zoom optical system relative to the reduction side conjugate position are substantially immovable.

According to another aspect of the present invention, a projection optical system is provided with: the zoom optical system set out in the foregoing; wherein a beam from an original disposed at said reduction conjugate position is projected onto a surface to be projected.

According to another aspect of the present invention, a projection optical system is provided with: the zoom optical system set out in the foregoing; a reflecting member disposed substantially at the position of the pupil for reflecting light from the zoom optical system; and a reflecting optical system including a plurality of reflecting surfaces for successively reflecting the light from the reflecting member; wherein a beam incident from an original disposed at the reduction conjugate position onto the zoom optical system is projected onto a surface to be projected by the reflecting optical system, and the reflecting member is rotated, whereby a projected image projected onto the surface to be projected is moved on the surface to be projected.

According to another aspect of the present invention, a zoom optical system is provided, in order from a reduction side to a magnification side, with: a first lens unit having positive optical power; a second lens unit having positive optical power; and a third lens unit having positive optical power; wherein the interval between adjacent ones of the first, second and third lens units is varied during zooming, and in an entire zooming range, the magnification side conjugate position relative to the reduction side conjugate position, and the position of the pupil of the zoom optical system relative to the reduction side conjugate position are substantially immovable.

According to another aspect of the present invention, a projection optical system is provided with: the zoom optical system set out in the foregoing; a reflecting member disposed substantially at the position of the pupil for reflecting light from the zoom optical system; and a reflecting optical system including a plurality of reflecting surfaces for successively reflecting the light from the reflecting member; wherein a beam incident from an original disposed at the reduction side conjugate position onto the zoom optical system is projected onto a surface to be projected by the reflecting optical system, and the reflecting member is rotated, whereby a projected image projected onto the surface to be projected is moved on the surface to be projected.

According to another aspect of the present invention, an image projecting apparatus is provided with: the projection optical system set out in the foregoing; and an image forming element for forming the original.

According to another aspect of the present invention, an image projecting system is provided with: the image projecting apparatus set out in the foregoing; and an image information providing apparatus for providing the image projecting apparatus with image information for forming the original.

BRIEF DESCRIPTION OF THE DRAWINGS

FIG. 1 schematically shows the construction of a zoom optical system which is an embodiment of the present invention.

FIG. 2A is a cross-sectional view of a zoom optical system which is first Embodiment of the present invention.

FIG. 3A is a cross-sectional view of a zoom optical system which is second Embodiment of the present invention.

FIG. 3B is a cross-sectional view of the zoom optical system which is second Embodiment of the present invention.

FIG. 13 is a table showing the refractive power of the lens units of first and second Numerical Embodiments and the synthesized refractive power of adjacent lens units.

DESCRIPTION OF THE PREFERRED EMBODIMENTS

Figure 2B:
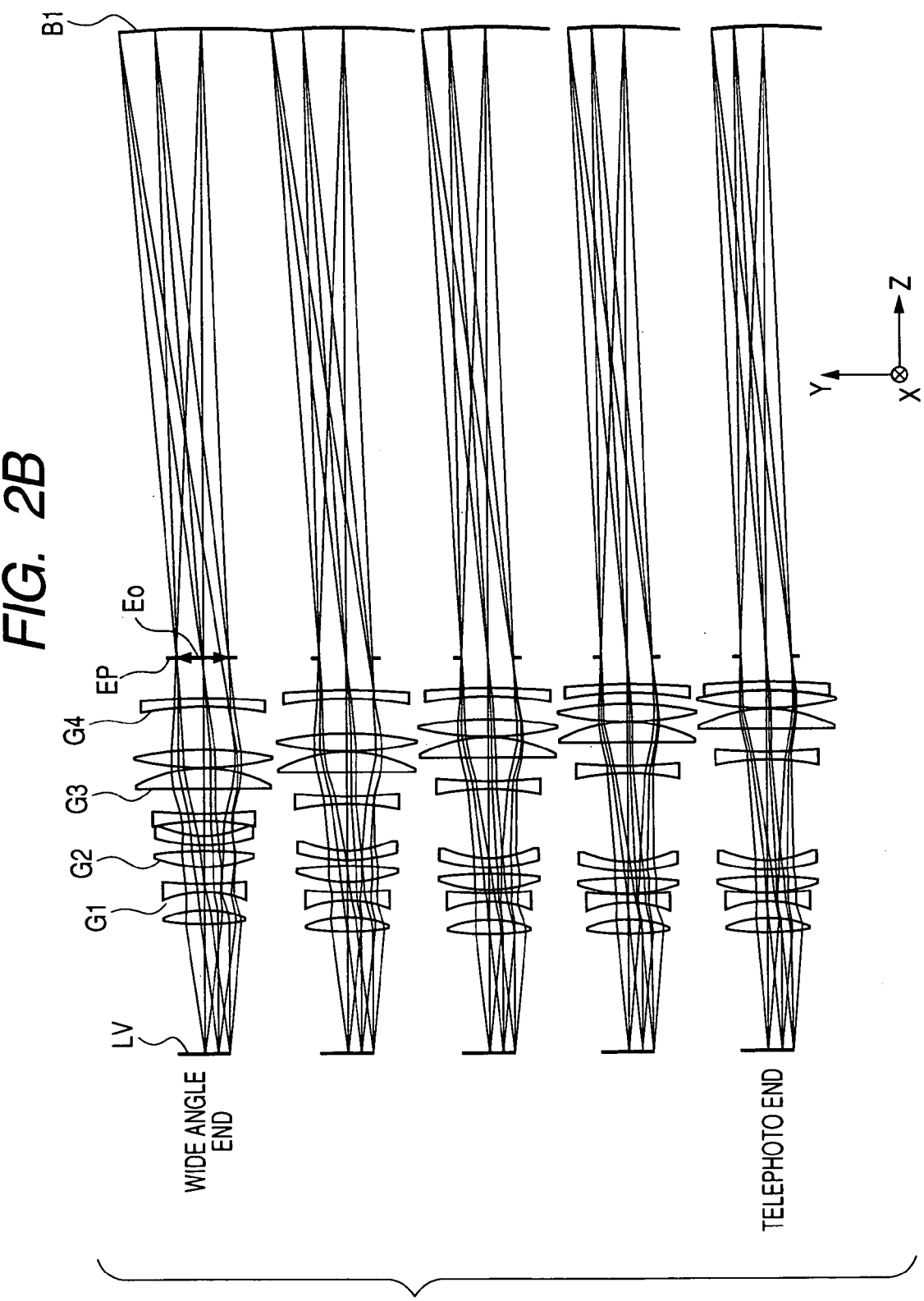
FIG. 2B is a cross-sectional view of the zoom optical system which is first Embodiment of the present invention.

This embodiment has as one of its objects to provide a zoom optical system not only excellent in the telecentricity on the object side (reduction conjugate side) and excellent in the invariability of the positions of the object surface (reduction conjugate position), the image plane (magnification conjugate position) and the exit pupil relative to the variation of the focal length, but also compact and bright and capable of securing the back focus sufficiently.

Description will first be made here of the features of the zoom optical systems according to the present embodiment.

One of the zoom optical systems according to the present embodiment has a plurality of variable power lens units including, in succession from the reduction side to the magnification side, a first lens unit having positive optical power, a second lens unit having positive optical power, a third lens unit having positive optical power, and a fourth lens unit having negative optical power which are moved integrally with one another during zooming. Also, another zoom optical system according to the present embodiment has a plurality of zooming lens units including, in succession from the reduction side to the magnification side, a first lens unit having positive optical power, a second lens unit having positive optical power, and a third lens unit having positive optical power which are moved integrally with each other during zooming. Of course, other optical elements may be auxiliarily included. For example, even if a polarizing plate, a wavelength plate, a lens small (the focal length being longer than the focal length at the wide angle end, or the double thereof) in optical power (refractive power), a diffraction grating, a mirror or the like is added to the zoom optical system according to the present embodiment, the zoom optical system will substantially not differ from that according to the present embodiment.

In these zoom optical systems, the respective lens units are moved so that the interval between adjacent ones of the lens units may be varied during zooming, and in an entire zooming range, the positions of conjugate points on the magnification side and the reduction side and the pupil between these conjugate points may be substantially immovable.

In the present embodiment, the above-mentioned pupil is located outside the zoom optical system. FIG. 1 shows the relation between the zoom optical system and the positions of the entrance pupil and exit pupil of the zoom optical system. The two pupils do not exist between the first surface to the last surface of the zoom optical system (inside the zoom optical system), but are located outside the zoom optical system.

A first feature is that in order to keep the entire zoom optical system compact and yet, secure a sufficient back focus and provide a bright optical system, the first lens unit most adjacent to the reduction side is given positive refractive power (optical power, i.e., the inverse number of the focal length). Thereby, it is possible to suppress the effective diameters of the lens units disposed more adjacent to the magnification side than the first lens unit and yet, make the numerical aperture (NA) of the object side great.

If the refractive power of the first lens unit is negative, the effective diameters of the second and subsequent lens units are liable to become large. Even if the second lens unit is given positive refractive power, if in case of the variation of the focal length, the interval between the first lens unit and the second lens unit is widened, the effective diameters thereof will be enlarged and after all, this leads to the bulkiness of the entire zoom optical system.

A second feature is that when changing the focal length of the zoom optical system from a short side to a long side, i.e., during zooming from the wide angle end to the telephoto end, the interval between the lens unit (the first lens unit) located most adjacent to the reduction side and the lens unit (the fourth lens unit or the third lens unit) located most adjacent to the magnification side is widened. When the pupil diameter is made constant relative to the variation of the focal length, the NA on the reduction side is maximum in the case of a minimum focal length (wide angle end), and becomes smaller as the focal length becomes longer. Therefore, at the wide angle end, design is made such that the lens unit located most adjacent to the magnification side is located most adjacent to the reduction side within the movable range thereof, and is moved toward the magnification side as the focal length becomes longer. Thereby, it becomes possible to obtain a high zooming ratio without making the effective diameter large.

A third feature is that in the entire zooming range, in order to keep the position of the object surface (the conjugate point on the reduction side) and the positions of the image plane and the pupil substantially constant (immovable) and yet, correct aberrations well, the lens unit disposed between the lens unit located most adjacent to the reduction side and the lens unit located most adjacent to the magnification side is also made movable.

It is possible to correct the aberrations better by increasing the number of the movable lens units, however, the present invention does not limit the number of the movable lens units. Further, by adding a focusing lens unit which substantially does not contribute the zooming, the number of the movable lens units is increased, however, this case is also covered by the scope of the present invention.

A fourth feature is that in all focal lengths, i.e., the entire zooming range, between the maximum focal length (telephoto end) and minimum focal length (wide angle end) of this zoom optical system, the synthesized refractive power of all sets of lens units comprising two lens units adjacent to each other is made positive.

Relative to the zoom optical systems according to first and second Embodiments which will be described later, FIG. 13 shows the refractive power p1 of the first lens unit, the refractive power p2 of the second lens unit, the refractive power p3 of the third lens unit and the refractive power p4 of the fourth lens unit, and the synthesized refractive power of the adjacent lens units at the focal length fw at the wide-angle end, the focal length fm at the middle position and the focal length ft at the telephoto end. In FIG. 13, for example, p1+p2 represents the synthesized refractive power of the first lens unit and the second lens unit at each focal length. In second Embodiment, the zoom optical system is a zoom optical system of a three-lens-unit construction in which the third lens unit and the fourth lens unit are integral with each other.

In a bright optical system having a long back focus, zooming is basically effected by positive refractive power in order not to make the entire length great. Further, the zooming is basically effected by positive refractive power as described above, to thereby widen the interval between the lens unit located most adjacent to the reduction side and the lens unit located most adjacent to the magnification side, whereby the focal length of the entire optical system is changed in its long direction.

A fifth feature is that the position of the lens unit located most adjacent to the reduction side at the telephoto end is nearer to the reduction side conjugate plane (conjugate point) than the position of the lens unit located most adjacent to the reduction side at the wide angle end is, and the position of the lens unit located most adjacent to the magnification side at the telephoto end is nearer to the magnification side conjugate plane than the position of the lens unit located most adjacent to the magnification side at the wide angle end is. Thereby, in spite of this optical system being compact, a high zooming ratio is obtained.

Figure 14:
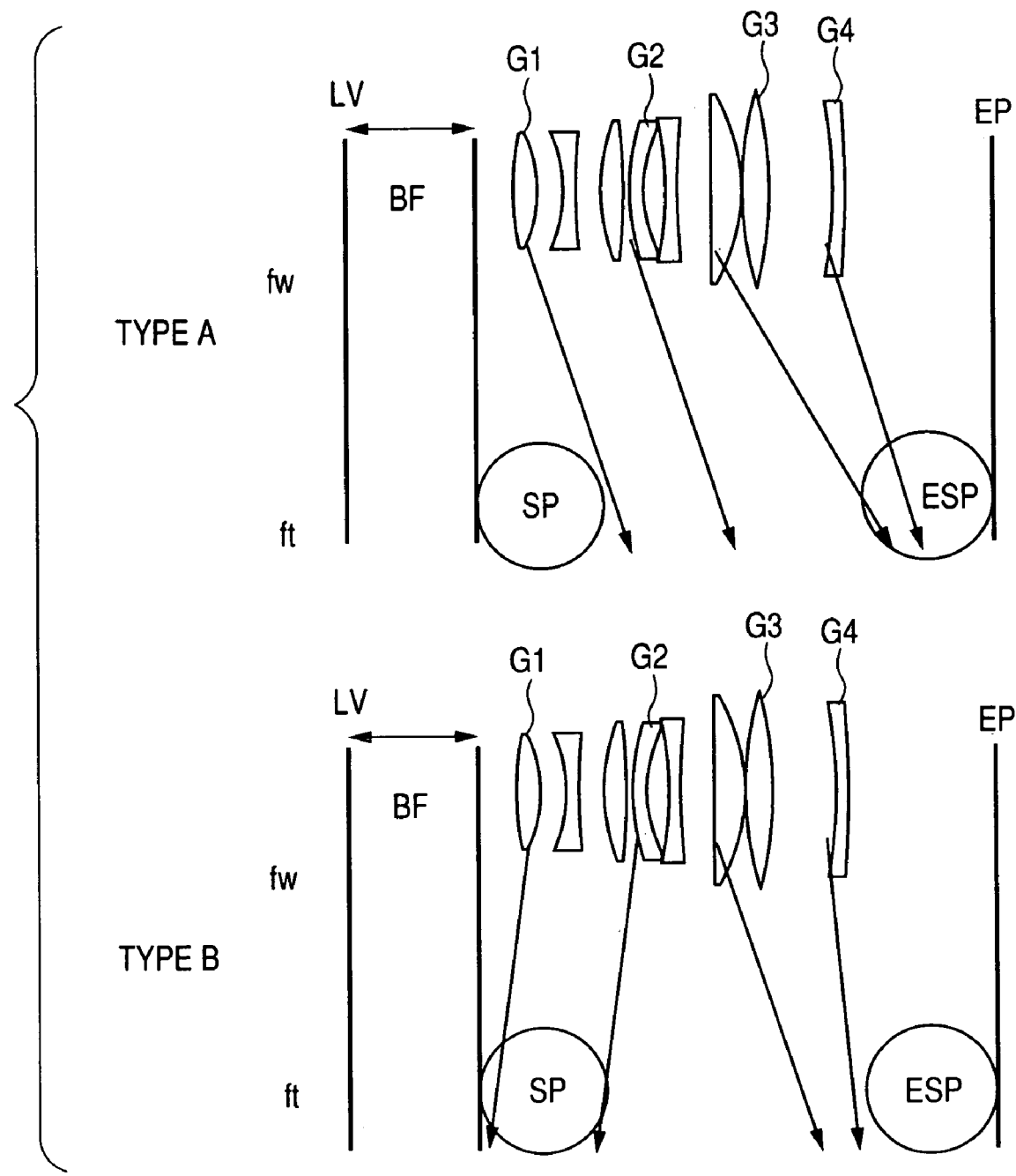
FIG. 14 compares the movement loci of respective lens units in a conventional example and the present embodiment during zooming from the wide angle end to the telephoto end.

When the reduction side conjugate plane is the object surface, the magnification side conjugate plane becomes the image plane, the reduction side pupil becomes the entrance pupil, and the magnification side pupil becomes the exit pupil. FIG. 14 schematically shows that during zooming from the wide angle end to the telephoto end, the movable lens units are moved along different loci. LV designates the object surface on which a light valve (liquid crystal display panel) is disposed in an image projecting apparatus which will be described later. G1 to G4 designate first to fourth lens units, BF denotes the back focus, EP designates the exit pupil, SP denotes the space on the object side, ESP designates the space on the exit pupil side, fw denotes the focal length at the wide angle end, and ft designates the focal length at the telephoto end.

In a case where as in A type, the first lens unit most adjacent to the object side is moved toward the image side (exit pupil side) as the focal length becomes longer it becomes impossible to make the most of the space SP on the object side for the zooming effected with the interval between the first lens unit G1 and the third lens unit G3 made great, and to obtain a high zooming ratio, the full length of the zoom optical system becomes great.

In contrast, during zooming in type B corresponding to the present embodiment, as the focal length becomes longer, the first lens unit G1 approaches the object surface and further, the third lens unit G3 is moved in a direction opposite to the first lens unit G1. Thereby, the space SP can be effectively utilized to more easily widen the interval between the first lens unit G1 and the third lens unit G3 than that in type A, and in a case where the same zooming ratio is obtained, the zoom optical system can be made more compact than in type A. Further, in the case of first Embodiment which will be described later, the fourth lens unit G4 is moved so as to sufficiently secure the space ESP in which a rotatable mirror (RM in FIG. 5) is disposed. Also, in the case of second Embodiment, the space ESP is secured and moreover, the third lens unit G3 is moved in the direction opposite to the first lens unit G1.

A sixth feature is that the object side is substantially telecentric, and a plurality of lens units are moved along a locus defined so that in the entire zooming range, the distance from the image side principal point to the exit pupil of this zoom optical system may become substantially equal to the focal length of the zoom optical system.

Also, in connection with this, a seventh feature is that a plurality of lens units are moved along a locus defined so that the interval between the object side principal point and image side principal point of the zoom optical system may become substantially equal to $$E = fz - fz(x' + fz)/x' \quad (1),$$

where E represents the distance from the object surface to the exit pupil plane located between this object surface and the image plane of the zoom optical system, x' represents a distance from the exit pupil plane to the image plane, and fz represents the focal length of the zoom optical system. While it is described here that "become substantially equal", this description means that deviation of 5% (preferably 3%, and more preferably 1%) from the value of the above conditional expression (1) is allowable.

Figure 4:
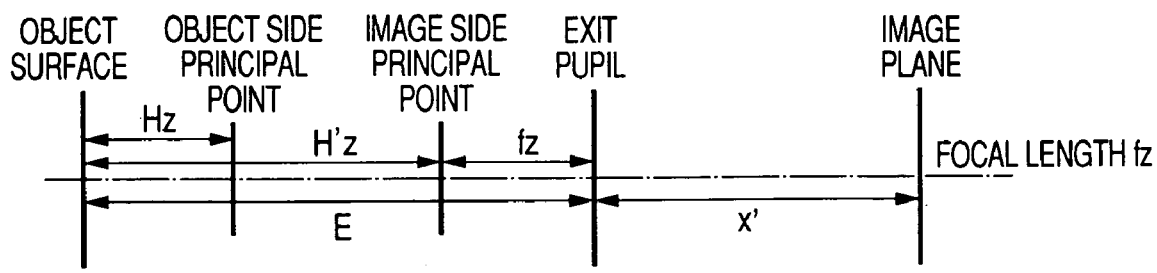
FIG. 4 shows the paraxial relationship of the zoom optical system of the present invention.

Here, FIG. 4 shows the paraxial relation of the zoom optical system according to the present embodiment. When the reduction side conjugate plane is the object surface, in a state in which the object side is telecentric, the exit pupil is formed at the position of a distance corresponding to the focal length fz of the zoom optical system from the image side principal point. That is, the disposition of the lens units in the zoom optical system according to the present embodiment and the movement loci thereof are set so that in the entire zooming range, the image side principal point may be located at a position of a distance corresponding to the focal length fz during zooming from a predetermined exit pupil position toward the object side (the sixth feature).

Figure 9:
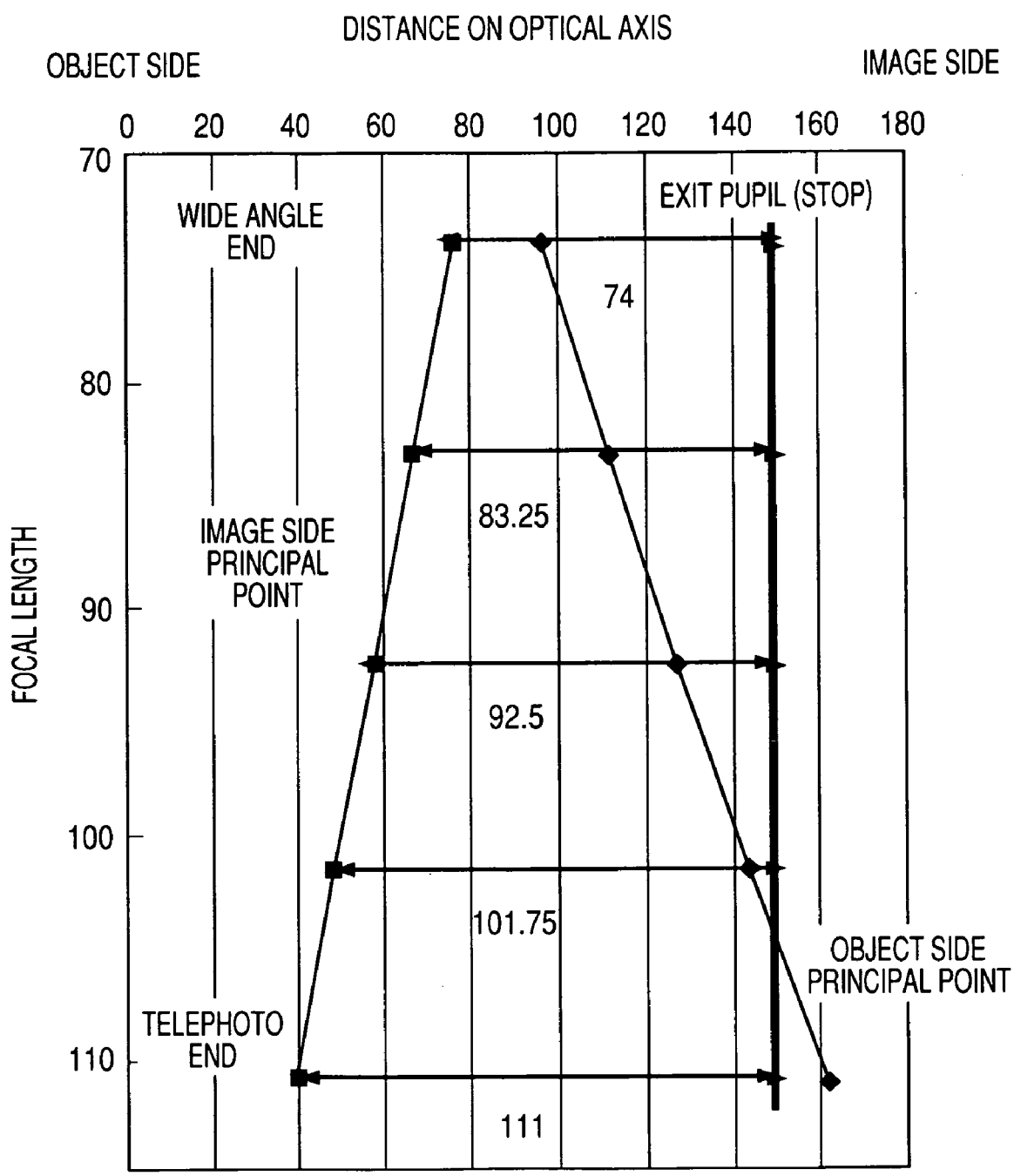
FIG. 9 shows the relations among the object side principal point, the image side principal point and the exit pupil position in first Numerical Embodiment.
Figure 11:
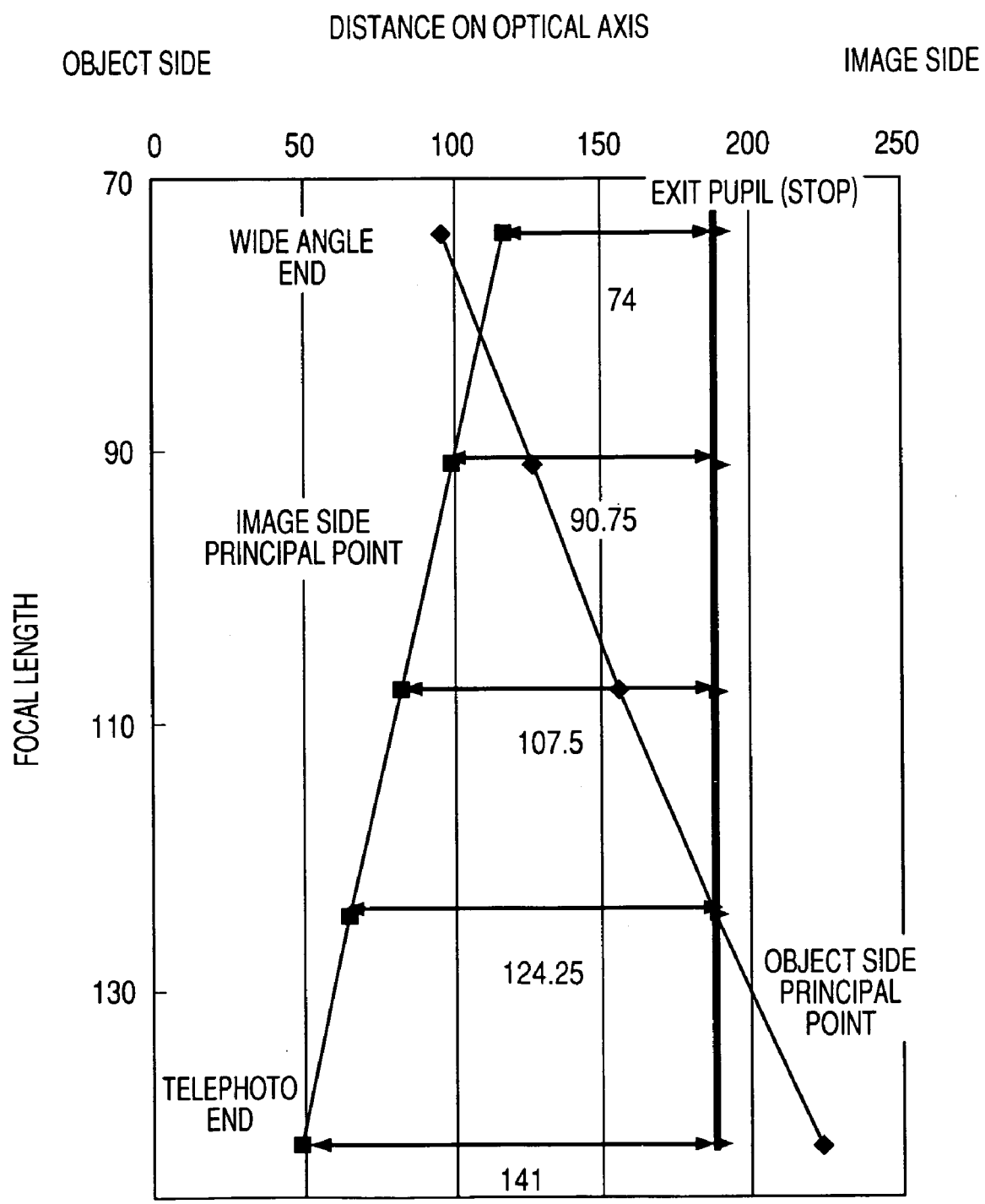
FIG. 11 shows the relations among the object side principal point, the image side principal point and the exit pupil position in second Numerical Embodiment.

For first and second Embodiments, the distance from the image side principal point to the exit pupil is shown in FIGS. 9 and 11. From these figures, it will be seen that the distance from the image side principal point to the exit pupil has become substantially equal to the focal length of the zoom optical system.

Also, the object side principal point is set so that in addition to the relation with the exit pupil position, a predetermined magnification may be provided in a state in which the object surface and the image plane are at predetermined positions during zooming.

That is, ideally, if the lens units are disposed so that the image side principal point may be located at a distance corresponding to the focal length fz away from the exit pupil position toward the object side and further, the interval (H'z–Hz) between the object side principal point and the image side principal point may become substantially equal to the value of the above-mentioned expression (1), it will be possible to make the positions of the object surface, the image plane, the entrance pupil (infinity) and the exit pupil constant (immovable) during zooming in a telecentric optical system (the seventh feature).

Figure 10:
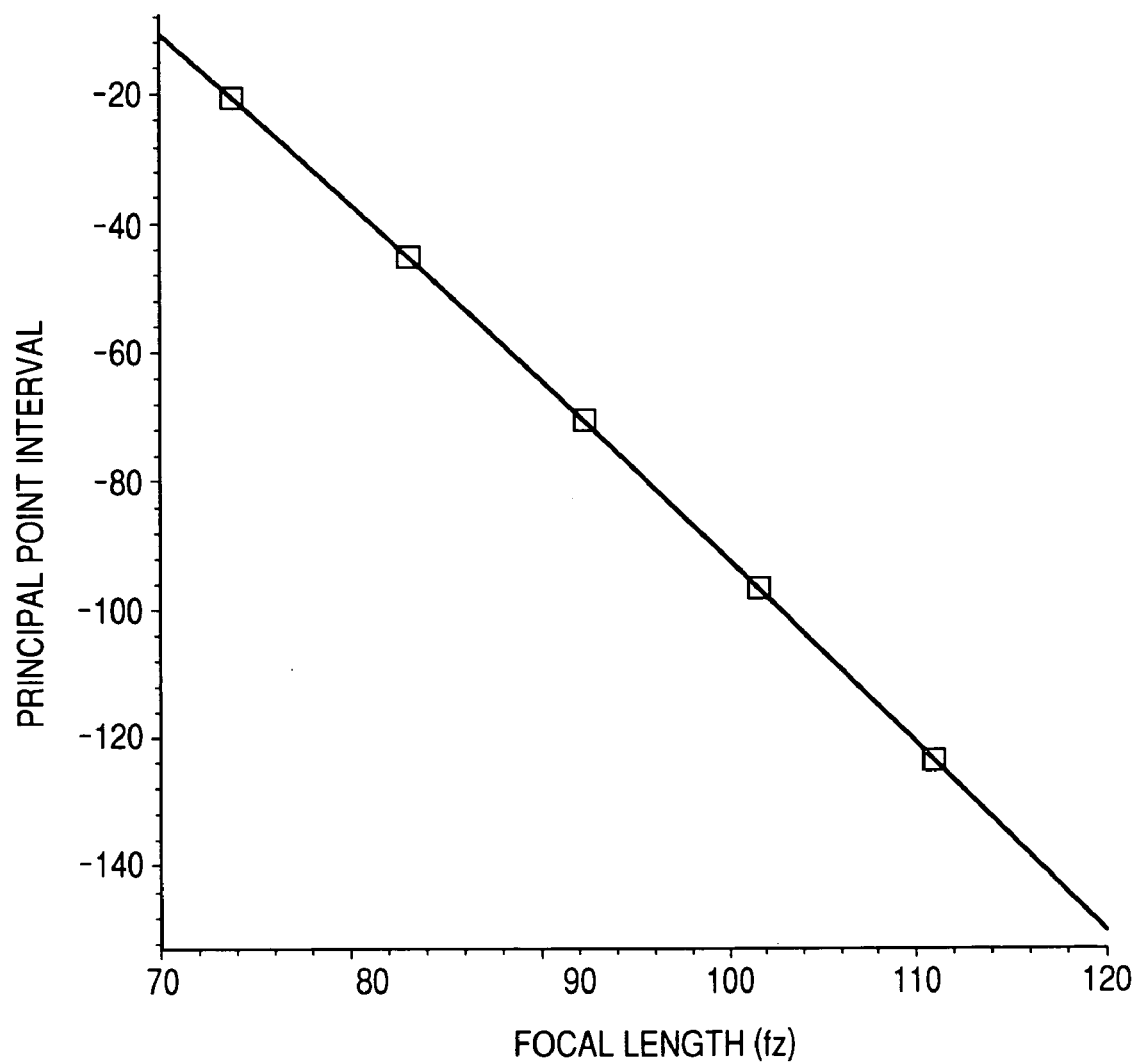
FIG. 10 shows the theoretical value and actual value of the principal point interval in first Numerical Embodiment.
Figure 12:
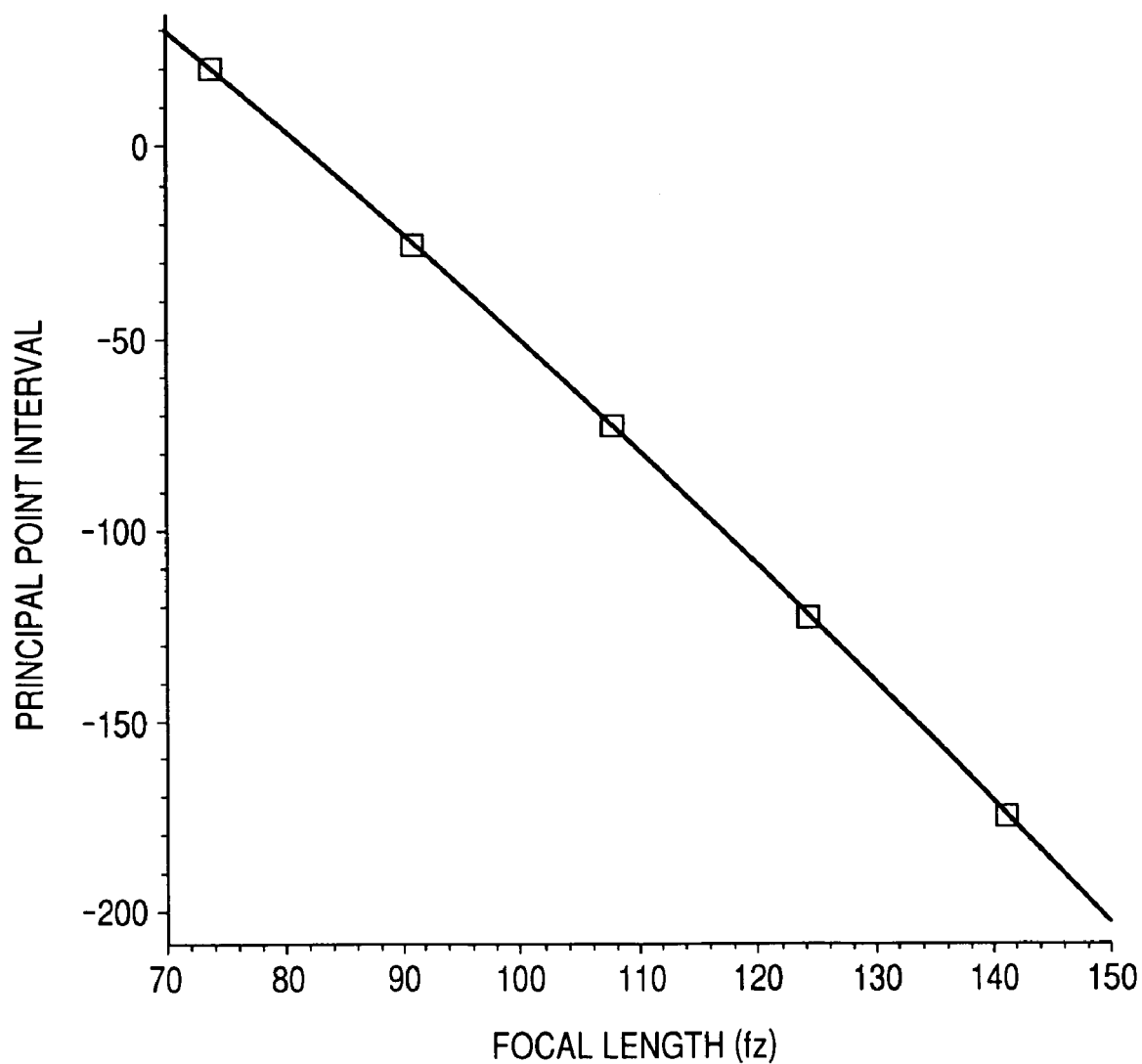
FIG. 12 shows the theoretical value and actual value of the principal point interval in second Numerical Embodiment.

For first and second Embodiments, in FIGS. 10 and 12, the theoretical value of expression (1) is indicated by solid line, and the actual principal point interval at each focal length when the range of the focal length is equally divided into five is plotted by a void mark. From these figures, it will be seen that the interval between the object side principal point and image side principal point of the zoom optical system has become substantially equal to the value of expression (1).

A eighth feature is that in the entire zooming range, the distance from the object surface to the first lens unit (back focus) is three times or more as great as the maximum object height (in the effective area of an image forming element such as a liquid crystal display panel disposed at the reduction side conjugate point position, the distance between the point at which the distance from the optical axis is greatest and the optical axis). In a three-plate type image projecting apparatus like an embodiment which will be described later, a color synthesizing member for synthesizing three red, green and blue color lights is disposed on the reduction side of the zoom optical system and therefore, if the back focus is three times or more as great as the maximum object height, it will be possible to secure a space (SP in FIG. 14) in which the color synthesizing member is disposed.

A ninth feature is that in the entire zooming range, the interval between the magnification side pupil of the zoom optical system and the lens unit located most adjacent to the magnification side is greater than ½ (preferably one time, and more preferably two times) of the minimum diameter (diameter) of the magnification side pupil.

Regarding first and Embodiments, cross sections including the minimum diameter of the magnification side pupil are shown in FIGS. 2B and 3B. As can be seen from these figures, in the entire zooming range between the telephoto end and the wide angle end, the interval between the magnification side pupil and the lens unit located most adjacent to the magnification side (the fourth lens unit G4 in first Embodiment, and the third lens unit G3 in second Embodiment), i.e., the space ESP shown in FIG. 14, is secured more widely than the minimum diameter of the reduction side pupil (as a matter of course, more widely than ½ of this minimum diameter).

Thereby, for example, in a case where as in the embodiment which will be described later, a rotatable mirror (RM in FIG. 4) is disposed at the position of the exit pupil, the interference between this mirror and the lens unit located most adjacent to the magnification side can be avoided. Actually, a driving mechanism for this mirror exists around the mirror and therefore, the above-mentioned distance need be made wider to a certain degree than ½ of the minimum diameter of the exit pupil, but may preferably be set within 10% of the distance (conjugate length) between the object surface and the image plane (the conjugate points on the reduction side and the magnification side). Also, the expression "the minimum diameter of the pupil" is for the purpose of applying it also to a case where the pupil diameter differs in two directions on the pupil plane orthogonal to each other. It is to be understood that the minimum diameter of the pupil is the diameter of the inscribed circle on the configuration of the pupil.

As another feature, in the present embodiment, an aspherical surface is used in the zoom optical system to correct aberrations well. The zoom optical system according to the present embodiment is compact and can obtain a high zooming ratio and at the same time, and unlike the zoom optical system for the exposing apparatus disclosed in Japanese Patent Application Laid-Open No. 2002-207167 and Japanese Patent Application Laid-Open No. 2002-55279, is suited for an optical apparatus such as a projector in which an optical system of a wider angle is required, and the focal length thereof at the wide angle end is smaller than that of the zoom optical system disclosed in Japanese Patent Application Laid-Open No. 2002-207167 and Japanese Patent Application Laid-Open No. 2002-55279. Therefore, the refractive power of the zoom optical system is great, and it becomes difficult to correct spherical aberration and chromatic aberration at a time over the entire zooming range. This is because chromatic aberration occurs greatly due to the strong positive refractive power of the entire optical system, and because it becomes more difficult than in an optical system having relatively small refractive power to correct chromatic aberration while correcting spherical aberration.

So, in the present embodiment, an aspherical surface is used to correct chromatic aberration while retaining compactness and spherical aberration is corrected by the degree of freedom of the shape this aspherical surface has. Particularly, when an aspherical surface is used as a surface having a large diameter, the aberration correcting effect is great. In second Embodiment, a zoom optical system using an aspherical surface is shown.

[First Embodiment]

Figure 5:
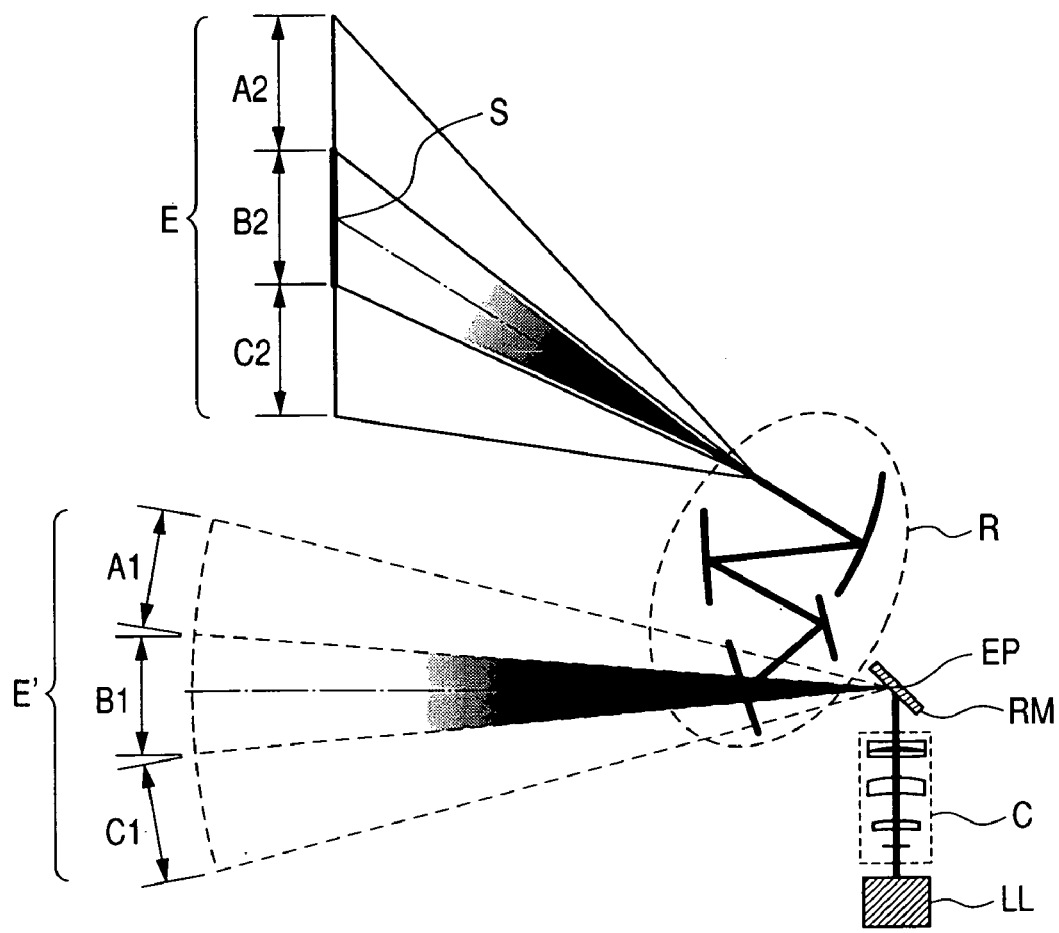
FIG. 5 shows the principle of changing a projection direction in an image projecting apparatus wherein the zoom optical system which is first Embodiment is used.

FIG. 5 shows an image projecting apparatus provided with a projection optical system comprising a combination of a zoom optical system which is an embodiment of the present invention and an off-axial optical system. Here, assuming a route a light beam passing through the center of the image and the center of the pupil follows is defined as a reference axis, the off-axial optical system is defined as an optical system including a curved surface (off-axial curved surface) in which a normal at the point of intersection of the constituent surface and the reference axis is not on the reference axis. In this case, the reference axis is of a bent shape. By the constituent surfaces of the optical system being made asymmetrical with respect to the reference axis and aspherical, an optical system in which aberrations have been corrected sufficiently can be configured (see Japanese Patent Application Laid-open No. H09-005650, Japanese Patent Application Laid-open No. H08-292371, Japanese Patent Application Laid-open No. H08-292372 and Japanese Patent Application Laid-open No. H09-222561).

Also, this off-axial optical system is such that the constituent surfaces are generally non-coaxial and the vignetting does not occur even on a reflecting surface and therefore, it is easy to configure an optical system using reflecting surfaces. Also, an intermediate image is formed in the optical system, whereby an optical system having a wide angle of field, and yet being compact can be configured. Further, there can be constructed an optical system having a front stop, and yet being compact because the leading of an optical path can be effected relatively freely.

In the present embodiment, by adopting such an off-axial optical system, it is possible to realize a projection optical system having a wide angle of field, high definition and a high zooming ratio, and further, by adopting the zoom optical system according to the present embodiment and moreover, rotating a plane mirror which will be described later, it becomes possible to greatly move or incline the position of a projected image (i.e., change the projection angle) with little deterioration of the quality of image.

A basic principle for changing the projection angle while keeping good optical performance will be described here with reference to FIG. 5.

In FIG. 5, LL designates an image forming element such as a liquid crystal panel and an illuminating system for illuminating light modulated by the image forming element. C denotes an optical block having imaging performance. The light emitted from the illuminating system and modulated by the image forming element is reflected by the rotatable plane mirror RM, and thereafter is imaged on an area B1 on a spherical surface E' having the position of the exit pupil EP of the first optical block C as the center of curvature. The first optical block C will suffice if it has the capability of imaging the light on a curved surface area B1, and may be a coaxial rotation-symmetrical optical block or an optical block including a reflecting surface having a curvature as a constituent. In the present embodiment, however, the first optical block C is constituted by the zoom optical system according to the present invention.

Further, when the plane mirror RM disposed at the position of the exit pupil EP is rotated on the plane of the drawing sheet of FIG. 5, the image formed on the area B1 is moved to an area A1 or C1 on the spherical surface E' with an optical change resulting very little. That is, the image is continuously moved on the spherical surface E' while preserving its imaged state.

The light thus reflected by the plane mirror RM is directed to a second optical block R as an off-axial optical system having a plurality of reflecting surfaces having curvatures as constituents. The second optical block R is designed to form the image on the spherical surface E' on a screen E with good optical performance at this time. Further, by the characteristic of the off-axial optical system, it is possible to obliquely project the image onto the screen E without causing any distortion of the image.

Accordingly, in a state in which the plane mirror RM is rotated to a position for directing the light to the area B1, the image of an original formed on the image forming element is displayed on an area B2 on the screen E through the first optical block C, the plane mirror RM and a second optical block R.

Then, the plane mirror RM is rotated, whereby the images formed on the areas A1, B1 and C1 on the spherical surface E' can be formed on areas A2, B2 and C2, respectively, on the screen E. That is, the image can be projected onto a range (screen E) within which the second optical block R ensures good optical performance, at any projection angle. However, the member rotated about the exit pupil EP of the first optical block C is not restricted to the plane mirror RM, but the first optical block C and the image forming element may be rotated integrally, or the second optical block R may be rotated. These are the relative rotations of the above-mentioned optical blocks and therefore, whichever optical block may be rotated, they are optically equivalent to each other.

Further, in the area B1 on the spherical surface E', the image need not always be formed on the spherical surface. That is, the surface E' need not be spherical. In other words, to make the projection angle variable, it is necessary for the image on the first optical block C to be continuously moved on E' while keeping good optical performance, and to ideally realize it, it is preferable that E' be a spherical surface. Actually, however, the allowable amount of optical performance such as the depth of focus or distortion has some latitude and therefore, if the optical performance is within this allowable amount, E' may be of any surface shape, and need not always be a spherical surface. Regarding the positional accuracy of the plane mirror RM disposed at the position of the exit pupil EP, the position of the plane mirror RM need not strictly coincide with the position of the exit pupil EP of the first optical block C, but can coincide with the latter within a certain degree of allowance.

Further, description will be made in greater detail of the imaging performance of the first optical block C. In a case where by the projection optical system in the present embodiment, the image plane S is made two-dimensionally movable on the screen E, if aberrations in the entire angle of field occur uniformly in respective azimuth directions, the aberrations need not be sufficiently corrected. This is because if the aberrations in the entire angle of field occur uniformly, correction is possible by the second optical block R constituted by a reflecting surface having a curvature.

Also, in a case where on the screen E, the position of the image plane S is made movable only in one-dimensional direction, if the aberrations in the entire angle of field are uniformly produced only in this direction of movement, the imaging performance in a direction differing from that direction of movement need not be good. This also is because correction is possible by the second optical block R.

While here, description has been made of only the principle about the movement of the image plane on the plane of the drawing sheet of FIG. 5, this also holds true of a case where the image plane is moved in a direction orthogonal to the aforementioned plane of the drawing sheet. However, in a case where the member rotated about the exit pupil EP of the first optical block C is only the plane mirror RM, and the image plane is two-dimensionally moved on the screen E, use may preferably be made of a plane mirror for the rotation in a horizontal direction and a plane mirror for the rotation in a vertical direction. This is because if in FIG. 5, the plane mirror RM is rotated in a direction orthogonal to the plane of the drawing sheet of FIG. 5, the image forming element and the plane mirror RM assume a twisted positional relationship and therefore, on the screen E, a light beam on the reference axis is imaged at a desired position, but the image plane S is rotated on the screen E.

However, it is physically impossible to dispose a plurality of plane mirrors at the exit pupil EP of the first optical block C. Therefore, if the plane mirror RM is not strictly disposed at the position of the exit pupil EP, but the image on E' is within the range of the allowable amount of the optical performance, two plane mirrors RM can be disposed near the exit pupil EP while being apart from each other to such a degree as will not interfere with each other.

Description will now be made of a case where zooming is effected in this projection optical system and the image projecting apparatus. If the first optical block C is given the zooming function and the sizes of the images-formed on the areas A1, B1 and C1 on the spherical surface E' formed by the first optical block C are varied, it is possible to vary the sizes of images formed on the areas A2, B2 and C2 on the actual image plane (screen) E.

However, to rotate the mirror RM at the position of the exit pupil EP of the first optical block C on the basis of the above-described principle, it is desirable that the position of the exit pupil EP be always kept constant during the zooming. If the position of this exit pupil EP is constant, the mirror RM and the second optical block R can be disposed at fixed positions.

In an ordinary camera lens, it is required that the positions of the object surface and image plane thereof do not fluctuate relative to the continuously varying focal length thereof, but in the first optical block C in the present embodiment, i.e., the zoom optical system according to the present invention, in addition to this, it is required that the positions of the entrance pupil and exit pupil thereof be kept constant relative to the variation of the focal length thereof. The reason why it is required that the position of the exit pupil be constant is as described in the foregoing principle, but regarding the position of the entrance pupil, it is because when a liquid crystal panel is used as the image forming element, telecentricity is required.

Description will hereinafter be made of more specific construction of a zoom optical system in a three-plate type image projecting apparatus for synthesizing red, green and blue modulated lights and causing them to enter the first optical block C which secures a sufficient space for inserting a color synthesizing element or the like between the image forming element and the first optical block C (zoom optical system) (i.e., the back focus of the first optical block C), is excellent in the telecentricity on the object side, and is excellent in the invariability of the positions of the object surface, the image plane, the entrance pupil and the exit pupil relative to the variation of the focal length.

Figure 6:
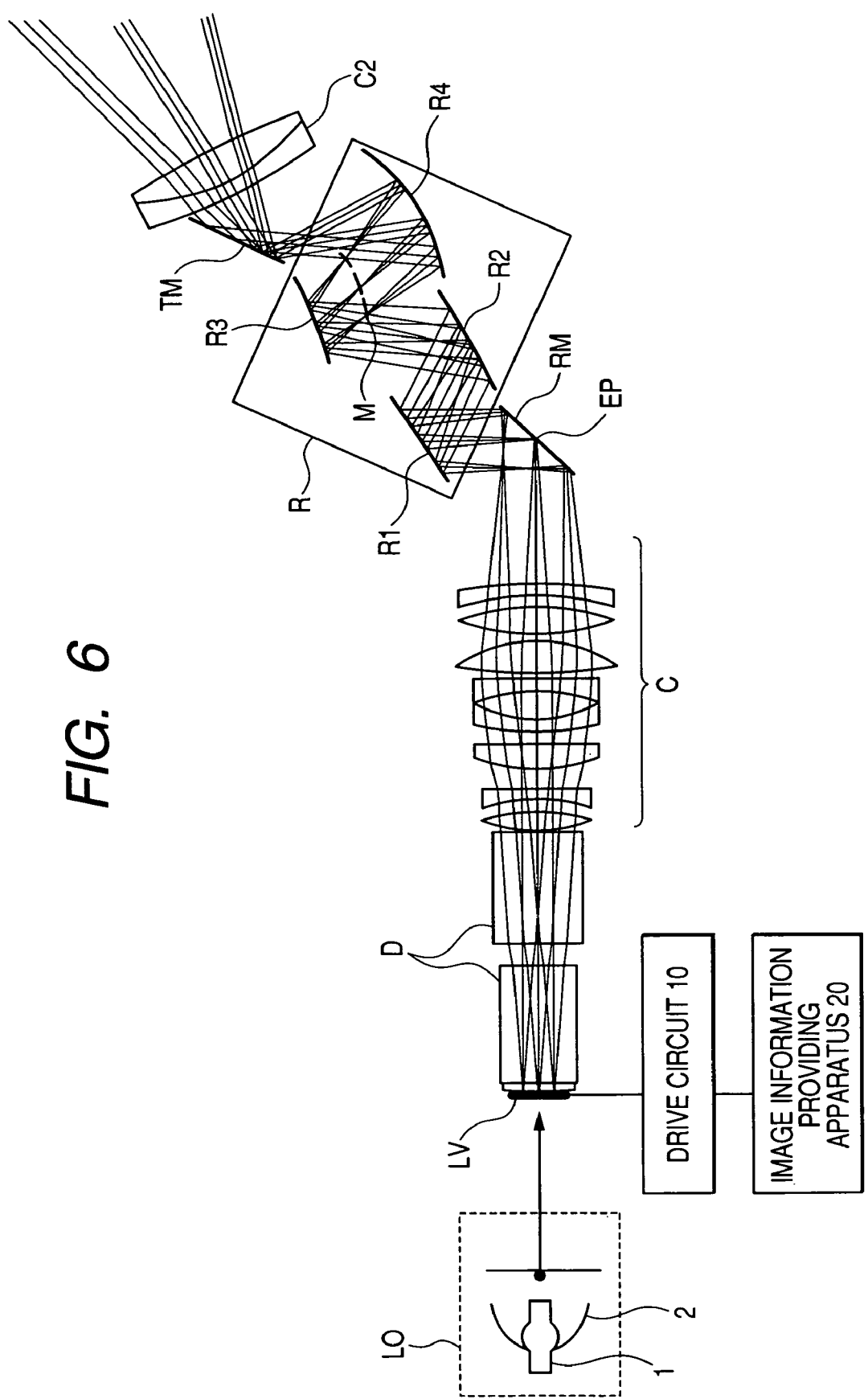
FIG. 6 is a cross-sectional view showing the image projecting apparatus according to first Embodiment and a projection optical system used therein.

FIG. 6 shows the general construction of the three-plate type image projecting apparatus. In FIG. 6, LO designates an illuminating system having a white light source lamp 1, a reflecting mirror 2, and a color splitting element (not shown) for splitting white light from the light source lamp 1 into three red, green and blue color components.

LV denotes a transmission type liquid crystal display panel as an image forming element. A drive circuit 10 is connected to this liquid crystal display panel LV. The drive circuit 10 has connected thereto an image information providing apparatus 20 such as a personal computer, a DVD player, a video (VCR), a television set, a digital video, a still camera, or a signal receiving unit comprising an antenna for receiving an image by an electric wave and a tuner. The drive circuit 10 having received image information from the image information providing apparatus 20 transmits a driving signal conforming to the image information to the liquid crystal display panel LV. The liquid crystal display panel LV having received the driving signal forms an original conforming to this driving signal by liquid crystal, and modulates illuminating light from the illuminating system LO. Although not shown in the present embodiment, there are provided three liquid crystal display panels LV for red, green and blue, and they form original for red, green and blue, respectively.

While in the present embodiment, description is made of a case where a transmission type liquid crystal display panel is used as an image forming unit, the present invention is not restricted thereto, but can also be applied to a case where use is made of a reflection type liquid crystal display panel or a digital micromirror array (DMD), or a case where use is made of a self-light emitting element (electroneminescence element) requiring no illuminating system.

D denotes a dichroic prism as a color synthesizing element for synthesizing the color lights modulated by the three liquid crystal display panels LV. The dichroic prism D is provided with a plurality of dichroic films, and synthesizes three color lights by transmitting or reflecting action conforming to a wavelength in these dichroic films. In FIG. 6, two dichroic prisms are shown, but these can be changed in conformity with what the image forming element LV requires. Also, polarizing beam splitters may be used instead of the dichroic prisms.

C designates a zoom optical system constituting the first optical block in FIG. 5, and a refractive optical unit (hereinafter referred to as the first refractive optical unit) constituted as a coaxial optical system by a plurality of lens units. EP denotes the exit pupil of this zoom optical system, and also the entrance pupil of a reflecting optical unit R as a second optical block which is an off-axial optical system constituted by a plurality of reflecting surfaces R1–R4. A stop may be provided at or near this position, as required.

The light color-synthesized by the dichroic prisms D travels via the first refractive optical unit C, the first plane mirror RM rotatable at the position of the exit pupil EP, and the reflecting optical units (R1–R4), and is enlarged and projected onto a screen, not shown, which is a surface to be projected, via a second plane mirror TM and a second refractive optical unit C2. Here, this second refractive optical unit C2 is constituted by a cemented lens comprising a negative lens (a negative meniscus lens convex toward the reduction conjugate side) and a positive lens (a biconvex lens), but is not restricted thereto. Of course, instead of the cemented lens, a negative lens and a positive lens may be disposed with an interval provided therebetween, or the second refractive optical unit C2 may be constituted by a biconcave lens and a biconvex lens, or a negative meniscus lens convex toward the magnification conjugate side and a positive meniscus lens convex also toward the magnification conjugate side may be cemented together. Also, the second refractive optical unit C2 may be constituted only by a positive lens (desirably a positive lens convex toward a magnification conjugate side, or only a negative lens. However, the number of refractive optical elements disposed more adjacent to the surface to be projected than the reflecting optical system may desirably be four or less.

Also, a projection optical system constituted by the first and second refractive optical units C and C2, the first and second plane mirrors RM and TM, and further the reflecting optical unit R well corrects trapezoid distortion by the reflecting optical unit R as an off-axial optical system, and obliquely projects an image onto the screen.

Also, by the first refractive optical unit C being included in the projection optical system, optical power necessary for the enlarged projection onto the screen can be suitably borne by the first refractive optical unit C and the reflecting optical unit R. Therefore, the curvature of each reflecting surface of the reflecting optical unit R can be made gentle to thereby simplify the manufacture and reduce the degree of sensitivity to a manufacturing error. The influence of astigmatism difference or the like due to the manufacturing errors of the reflecting surfaces is greater in the surface nearer to the pupil. Astigmatism difference or the like caused in the first reflecting surface of the plurality of reflecting surfaces which is nearest to the exit pupil EP is enlarged in conformity with the magnification of this reflecting optical unit. Accordingly, a magnification (optical power) necessary for image projection is shared by a refractive optical system which is low in the degree of sensitivity to the deterioration of performance due to the manufacturing error, as compared with the reflecting optical system, whereby the degree of sensitivity of the reflecting optical system can be reduced.

Further, even if the projection optical system has a wide angle of field, the focal length of the first refractive optical unit C is set to a long one, whereby it becomes relatively easy to suppress the occurrence of chromatic aberration of magnification. In the reflecting optical unit R, chromatic aberration does not occur, and this is effective in respect of the correction of aberrations.

In FIG. 6, the reflecting surfaces R1–R4 (all of which have optical power) constituting the reflecting optical unit R have a rotation-asymmetrical shape, and constitute an off-axial optical system of which the reference axis is bent as previously described.

Further, in the present embodiment, intermediate image (intermediate imaging plane M) is once formed between the reflecting surfaces R3 and R4 in the reflecting optical unit R (a surface conjugate with both of the liquid crystal display panel and the screen is formed between the reflecting surfaces R3 and R4 in the reflecting optical unit). Thereby, as compared with a case where provision is not made of the intermediate imaging plane, the size of each reflecting surface can be made small, and this is effective in producing a surface shape accurately. The position of the intermediate imaging plane is not restricted to the position shown in FIG. 6. While in the present embodiment, the reflecting optical unit R includes four reflecting surfaces having optical power, this is not restrictive, but the reflecting optical unit R may include two or more (preferably three or more) reflecting surfaces. If the configuration is designed so that an intermediate image is formed between the reflecting surface most adjacent to the screen and the second reflecting surface as counted from the screen side, the size of each reflecting surface can be made small.

Accordingly, in the projection optical system shown in FIG. 6, the first plane mirror RM is rotated in accordance with the principle of varying the projection angle described with reference to FIG. 5, whereby the projection angle of the image from the projection optical system can be varied.

The zoom optical system according to the present embodiment is suitable for an off-axial optical system which secures a sufficient space for inserting a color synthesizing member or the like thereinto, is excellent in telecentricity on the object side, and is excellent in the invariability of the positions of the object surface, the image plane and the exit pupil relative to the variation of the focal length, and in which a space for disposing a rotatable mirror therein is secured between the lens unit nearest to the position of the exit pupil and the position of the exit pupil, and which has the function of moving the image plane, and an image projecting apparatus using the same.

The zoom optical systems according to the present first and second Embodiments which will be described later correspond to the zooming partial system of a projection optical system of which the liquid crystal panel size is 0.7 inch and the aspect ratio is 4:3.

FIGS. 2A and 2B show the constructions of the XZ cross section and YZ cross section of a zoom optical system constituting the first refractive optical unit C. As previously described, this zoom optical system is used as a partial system constituting a portion of a projection optical system. In these figures, LV, D and EP designate the same constituents as those designated by the reference characters in FIG. 6.

In FIGS. 2A and 2B, this zoom optical system includes in succession from the reduction side to the magnification side (in the present embodiment, from the liquid crystal display panel LV side which is the object side to the spherical surface area B1 side which is the image side: hereinafter B1 will be referred to as the image plane), a first lens unit G1 having positive refractive power, a second lens unit G2 having positive refractive power, a third lens unit G3 having positive refractive power, and a fourth lens units G4 having negative refractive power. The first to fourth lens units G1–G4 are integrally moved along an optical axis AXL during zooming which varies the focal length, and the interval between adjacent ones of the lens units is varied.

Also, this zoom optical system is such that in all focal length states between a maximum focal length (telephoto end) and a minimum focal length (wide angle end), i.e., in the entire zooming range, the object side is always substantially telecentric, and the position of the exit pupil EP located between the fourth lens unit G4 and the image plane B1, the position of the reduction side conjugate point at which the liquid crystal display panel LV is disposed, and the position of the magnification side conjugate point at which the image plane B1 is located are substantially immovable.

Here, the position of the image plane B1 (the position of the magnification side conjugate point) being immovable means that the position of this image plane B1 and the position of the liquid crystal display panel (the position of the reduction side conjugate point) are substantially invariable. Specifically, the distance between the conjugate point of the liquid crystal display panel formed by the optical system (including the first refractive optical unit C) disposed between the liquid crystal display panel and the exit pupil and the liquid crystal display panel (the distance on the optical path of a light beam passing through the optical axis of the first refractive optical unit) fluctuates only up to 5% (preferably 3%, and more preferably 1%) in the entire zooming range (from the wide angle end to the telephoto end). The fluctuation of the distance referred to here means that the minimum value of the distance in the entire zooming range exists within the range of deviation within 5% of the maximum value, relative to the maximum value (the maximum value×0.95≦the minimum value).

This also holds true of the position of the exit pupil, and means that the position of the exit pupil relative to the position of the liquid crystal display panel is invariable. Also, the minimum value of the distance between the exit pupil and the liquid crystal display panel in the entire zooming range is 95% or more (preferably 97% or more, and more preferably 99% or more) of the maximum value.

This is because as previously described, actually, the allowable amount of such optical performance as the depth of focus or the distortion has some latitude.

Also, in this zoom optical system, during zooming from the wide angle end to the telephoto end, the interval between the first lens unit G1 and the second lens unit G2 is monotonously decreased, and the interval between the second lens unit G2 and the third lens unit G3 is monotonously increased. Also, the interval between the third lens unit G3 and the fourth lens unit G4 is monotonously decreased. That is, the interval between the first lens unit G1 and the second lens unit G2 at the telephoto end is narrower than the interval at the wide end angle, and the interval between the third lens unit G3 and the fourth lens unit G4 at the telephoto end is narrower than the interval at the wide end angle. During zooming from the wide angle end to the telephoto end, the interval between the first lens unit G1 and the fourth lens unit G4 (and further, the interval between the first and third lens units G1 and G3) are monotonously increased.

Also, the position of the first lens unit G1 at the telephoto end is nearer to the reduction side conjugate point (LV) than the position of the first lens unit G1 at the wide angle end is, and the position of the fourth lens unit G4 at the telephoto end is nearer to the magnification side conjugate point (B1) than the position of the fourth lens unit G4 at the wide angle end is. Further, during zooming from the wide angle end to the telephoto end, the fourth lens unit G4 approaches the pupil EP on the magnification side.

Also, in the present embodiment, as shown in FIGS. 2A and 2B, the width Eo of the exit pupil EP in the Y-axis direction and the width Er thereof in the X-axis direction are in the relation that Eo<Er (for example, Er=2Eo). That is, the diameter of the exit pupil EP differs between in the Y-axis direction and in the X-axis direction, and the minimum diameter is Eo.

Also, the image B1 in FIG. 2A, as described in connection with the aforedescribed principle of making the direction of projection variable, is moved by the plane mirror RM being disposed and rotated at the position of the exit pupil EP.

In the present first Embodiment, the first lens unit G1 is given positive refractive power in order to keep the entire zoom optical system compact and yet, make it an optical system which secures a back focus and further, is bright.

As first Numerical Embodiment corresponding to first Embodiment shown in FIGS. 2A and 2B, the construction data of the zoom optical system are shown in Table 1 below. In Table 1, the "surface No." i indicates the i-th surface as counted from the object side. The "radius of curvature" indicates the paraxial radius of curvature (mm) of the i-th surface, the "surface interval" indicates the interval (mm) between the i-th surface and the (i+1)-th surface, and the "refractive index" and the "Abbe Constant" indicate the refractive index and Abbe Constant, respectively, of the medium between the i-th surface and the (i+1)-th surface. These definitions also hold true in the ensuing numerical embodiments.

TABLE 1

<<First Numerical Embodiment>>
Size of the liquid crystal panel: 0.7 inch
(maximum object height 8.89 mm)
Focal length fz: 74.0–111.0
Magnification ratio: 1.50
Diameter of aperture stop (diameter): 40.0 mm

| surface No. | radius of curvature | surface interval | refractive index | Abbe Constant |
|---|---|---|---|---|
| object surface | infinity | variable(d0) | | |
| 1 | 53.61710222 | 5.15352709 | 1.751118 | 32.0203 |
| 2 | −55.3882785 | 7.45299917 | | |
| 3 | −29.4021317 | 3 | 1.744823 | 28.0118 |
| 4 | 153.3705502 | variable(d4) | | |
| 5 | 38.00839083 | 6.03659406 | 1.491871 | 69.9199 |
| 6 | −165.678943 | 2.20140471 | | |
| 7 | 60.23046648 | 3 | 1.638997 | 34.5361 |
| 8 | 29.8716607 | variable(d8) | | |
| 9 | −60.6051538 | 3 | 1.755201 | 27.5795 |
| 10 | 168.0378757 | 9.16794612 | | |
| 11 | 4400.600764 | 7.80822089 | 1.62041 | 60.3236 |
| 12 | −42.2103158 | 0.1 | | |
| 13 | 114.0586817 | 6.38130649 | 1.724122 | 46.4918 |
| 14 | −115.481562 | variable(d14) | | |
| 15 | −1.09E+02 | 3 | 1.755201 | 27.5795 |
| 16 | −259.447529 | variable(d16) | | |
| 17 | infinity | 240 | | |
| 18(image plane) | −240 | 0 | | |

| Variable interval | | | | | |
|---|---|---|---|---|---|
| fz | 74 | 83.25 | 92.5 | 101.75 | 111 |
| d0 | 49.43 | 46.397 | 45.1714 | 45 | 45 |
| d4 | 6.1793 | 3.4688 | 1.5004 | 0.1906 | 0.1 |
| d8 | 6.0118 | 17.8272 | 25.411 | 33.2021 | 38.498 |
| d14 | 16.5857 | 13.8438 | 9.246 | 4.5385 | 0.1 |
| d16 | 15.4912 | 12.1612 | 11.3692 | 10.7669 | 10 |

Here, the back focus (the distance between the first lens unit and the reduction side conjugate position) in Table 1 above is 45 (mm) or greater and 49.43 (mm) or less. This value is a value obtained by air-converting the back focus, and should desirably be 35 mm or greater (preferably 40 mm or greater) in the entire zooming range. In other words, it should preferably be 45% or more (preferably 50% or more) of the focal length of the zoom optical system at the wide angle end thereof. Further, this back focus is of the order of about 5.06–5.50 times as great as the maximum object height (8.89 mm) in the entire zooming range. This back focus should desirably be three times or more (preferably four times or more) as great as the maximum object height, and ten times or less (preferably seven times or less). These can also be said in second Numerical Embodiment below.

Also, in the present embodiment, the zoom ratio (a value obtained by dividing the focal length at the telephoto end by the focal length at the wide angle end) is 1.50, but this is not restrictive. Here, it can be at least 1.2 times (preferably 1.3 times or more, and more preferably 1.4 times or more). The upper limit value should desirably be 3.0 times or less, and preferably 2.5 times or less, more preferably 2.0 times or less. This can also be said about second Numerical Embodiment (a zoom ratio of 1.90) below.

In FIG. 13, the refractive power of each lens unit in the present first Numerical Embodiment and the synthesized refractive power of adjacent ones of the lens units are shown with respect to the case of the focal length fw at the wide angle end, the focal length fm at the middle position, and the focal length ft at the telephoto end. The synthesized refractive power of adjacent ones of the lens units is positive irrespective of the focal lengths thereof.

Also, FIG. 9 shows that the interval between the exit pupil and the image side principal point position in the present first Numerical Embodiment is substantially equal to the focal length of the zoom optical system. As can be seen from this figure, the respective lens units are disposed so that the distance fz from the image side principal point to the exit pupil may substantially coincide with each focal length and therefore, in addition to the object surface and the image plane, the exit pupil plane can be made immovable during zooming.

Further, in FIG. 10, the theoretical value of expression (1) is indicated by solid line, and the actual principal point interval at each focal length when the range of the focal length is equally divided into five is plotted by a void mark. From this figure, it will be seen that the interval between the object side principal point and image side principal point of the zoom optical system of the present first Numerical Embodiment is substantially equal to the value of expression (1).

Figure 7:
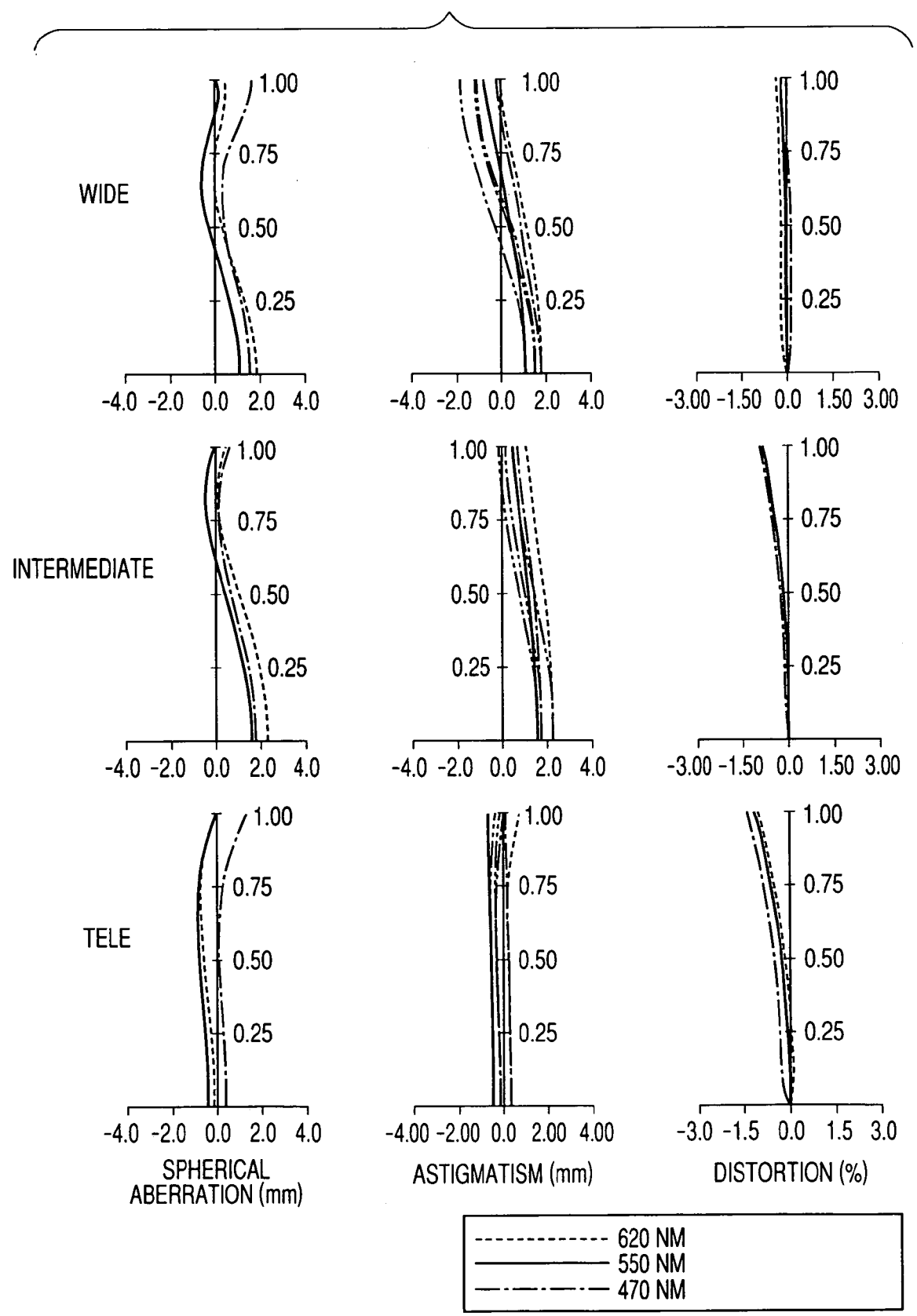
FIG. 7 shows the longitudinal aberrations of first Numerical Embodiment of the present invention.

Also, FIG. 7 shows the longitudinal aberrations in the present first Numerical Embodiment. In FIG. 7, in succession from above, the longitudinal aberrations at a wide angle position (focal length of 74 mm), a middle position (focal length of 92.5 mm) and a telephoto position (focal length of 111 mm) are shown. The wavelengths of an evaluating light beams are 620 nm (red R), 550 nm (green G) and 470 nm (blue B). From this figure, it will be seen that good imaging is done.

[Second Embodiment]

FIGS. 3A and 3B show the constructions of the XZ cross section and YZ cross section of a zoom optical system which is second Embodiment of the present invention and which constitutes the first refractive optical unit C shown in FIG. 6. This zoom optical system is used as a partial system constituting a portion of a projection optical system. In these figures, LV, D and EP designate the same constituents as those designated by the reference characters in FIG. 6.

In FIGS. 3A and 3B, this zoom optical system includes, in succession from the reduction side to the magnification side (in the present embodiment, from the liquid crystal display panel LV side which is the object side to the spherical surface area B1 side which is the image side: B1 will hereinafter referred to as the image plane), a first lens unit G1 having positive refractive power, a second lens unit G2 having positive refractive power, and a third lens unit G3 having positive refractive power. The third lens unit G3 is constituted by a 3a lens sub-unit G3a unit G3b having negative refractive power, that is, this zoom optical system can also be considered to be of a four-lens-unit construction.

The first to third lens units G1 to G3 are moved integrally along an optical axis AXL during zooming which changes the focal length, and the intervals between adjacent ones of the lens units are varied.

Also, this zoom optical system is such that in every focal length states between the maximum focal length (telephoto end) and the minimum focal length (wide angle end), i.e., in the entire zooming range, the object side is always substantially telecentric, and the position of an exit pupil EP located between the third lens unit G3 and the image plane B1, the position of a reduction side conjugate point at which the liquid crystal display panel LV is disposed, and the position of an magnification side conjugate point at which the image plane B1 is located are substantially immovable.

Also, in this zoom optical system, during zooming from the wide angle end to the telephoto end, the interval between the first lens unit G1 and the second lens unit G2 is monotonously increased. Also, the interval between the second lens unit G2 and the third lens unit G3 is narrowest at the wide angle end, and is once widened, and thereafter becomes narrower toward the telephoto end. That is, the interval between the first lens unit G1 and the second lens unit G2 at the telephoto end is wider than this interval at the wide angle end, and the interval between the second lens unit G2 and the third lens unit G3 at the telephoto end is wider than this interval at the wide angle end. During zooming from the wide angle end to the telephoto end, the interval between the first lens unit G1 and the third lens unit G3 is monotonously increased.

Also, the position G1 of the first lens unit at the telephoto end is nearer to the reduction side conjugate point (LV) than the position of the first lens unit G1 at the wide angle end is, and the position of the third lens unit G3 at the telephoto end is nearer to the magnification side conjugate point (B1) than the position of the third lens unit G3 at the wide angle end is. Further, during zooming from the wide angle end to the telephoto end, the third lens unit G3 approaches the pupil EP on the magnification side.

Also, in the present embodiment, as shown in FIGS. 3A and 3B, the width Eo of the exit pupil EP in the Y-axis direction and the width Er thereof in the X-axis direction are in the relation that Eo<Er (for example, Er=2Eo). That is, the diameter of the exit pupil EP differs between in the Y-axis direction and in the X-axis direction, and the minimum diameter is Eo.

Also, the image B1 in FIG. 3A, as described in connection with the aforedescribed principle of making the direction of projection variable, is moved by the plane mirror RM being disposed and rotated at the position of the exit pupil EP.

In the present second Embodiment, the first lens unit G1 is given positive refractive power in order to keep the entire zoom optical system compact and yet, make it into an optical system which secures a back focus and is brighter.

As second Numerical Embodiment corresponding to second Embodiment shown in FIGS. 3A and 3B, the construction data of the zoom optical system are shown in Table 2 below.

In the present embodiment, the 14th surface having the largest diameter in this zoom optical system is made into an aspherical surface to thereby correct aberrations well.

It is to be understood here that the aspherical surface shape is represented by the following expression (2) with assumption that the r axis is taken in a direction orthogonal to the optical axis, and the direction of travel of light is defined as the positive, and K represents the conic constant, and A, B,C, and D represent the fourth order to tenth order of deformation coefficients, respectively, and the constant and coefficients in this expression are described in Table 2 of second Embodiment. "E–X" indicates "$\times 10^{-x}$". Also, C is the curvature of the surface vertex.

$$Z(r) = \frac{Cr^2}{\sqrt{2-(1+K)C^2r^2}} + Ar^4 + Br^6 + Cr^8 + Dr^{10} \quad (2)$$

TABLE 2

$r^2 = x^2 = y^2$
<<Second Numerical Embodiment>>
Size of the liquid crystal panel: 0.7 inch
(maximum object height 8.89 mm)
Focal length fz: 74.0–141.0
Magnification ratio: 1.905
Diameter of aperture stop (diameter): 40.0

| surface No. | radius of curvature | surface interval | refractive index | Abbe Constant |
|---|---|---|---|---|
| object surface | infinity | variable(d4) | | |
| 1 | −51.33118354 | 5.722388407 | 1.695209 | 49.3044 |
| 2 | −36.77096805 | 0.1 | | |
| 3 | 141.5585277 | 3 | 1.509284 | 68.1314 |
| 4 | 804.8794779 | variable(d4) | | |
| 5 | −13247.55809 | 3 | 1.531902 | 51.5507 |
| 6 | 114.8496119 | 1.345060972 | | |
| 7 | 645.0260105 | 4.093972758 | 1.627107 | 59.0145 |
| 8 | −58.95031468 | variable(d8) | | |
| 9 | −22.93044249 | 4.109825335 | 1.751067 | 30.8953 |
| 10 | −116.7659456 | 10.92718424 | | |
| 11 | −80.20138961 | 9.860955242 | 1.613462 | 60.6846 |
| 12 | −33.28644625 | 0.1 | | |
| 13 | −423.6068671 | 8.195352556 | 1.703823 | 48.4068 |
| 14(aspherical surface) | −46.97461013 | 0.1 | | |
| 15 | −56.67133332 | 3 | 1.754158 | 28.2974 |
| 16 | −99.6257187 | Variable(d16) | | |
| 17 | infinity | 240 | | |
| 18(image plane) | −240 | 0 | | |

Aspherical surface coefficient

| 14th surface | K (conic constant): −0.418820 |
| --- | --- |
| | A (4th order): 0.117232E−7 |
| | B (6th order): −0.245731E−10 |
| | C (8th order): 0.117125E−12 |
| | D (10th order): −0.634508E−16 |

Variable interval

| fz | 74 | 90.75 | 107.5 | 124.25 | 141 |
|---|---|---|---|---|---|
| d0 | 49.5538 | 49.1059 | 48.3773 | 47.6139 | 46.4036 |
| d4 | 0.4951 | 18.8087 | 38.0391 | 56.1861 | 73.2455 |
| d8 | 3.6184 | 15.0905 | 17.1347 | 14.0045 | 6.7962 |
| d16 | 82.778 | 53.4401 | 32.8942 | 18.6408 | 10 |

FIG. 13 shows the refractive power of each lens unit and the synthesized refractive power of adjacent ones of the lens units in the present second Numerical Embodiment with respect to the cases of the focal length fw at the wide angle end, the focal length fm at the middle position and the focal length ft at the telephoto end. The synthesized refractive power of adjacent ones of the lens units is positive irrespective of the focal length.

Also, FIG. 11 shows that the interval between the exit pupil and the image side principal point position in the present second Numerical Embodiment is substantially equal to the focal length of the zoom optical system. As will be seen from this figure, the respective lens units are disposed so that the distance fz from the image side principal point to the exit pupil may substantially coincide with each focal length and therefore, in addition to the object surface and the image plane, the exit pupil plane can be made immovable during zooming.

Further, in FIG. 12, the theoretical value of expression (1) is indicated by solid line, and the actual principal point interval at each focal length when the range of the focal length is equally divided into five is plotted by a void mark. From this figure, it will be seen that the interval between the object side principal point and image side principal point of the zoom optical system in the present second Numerical Embodiment is substantially equal to the value of expression (1).

Figure 8:
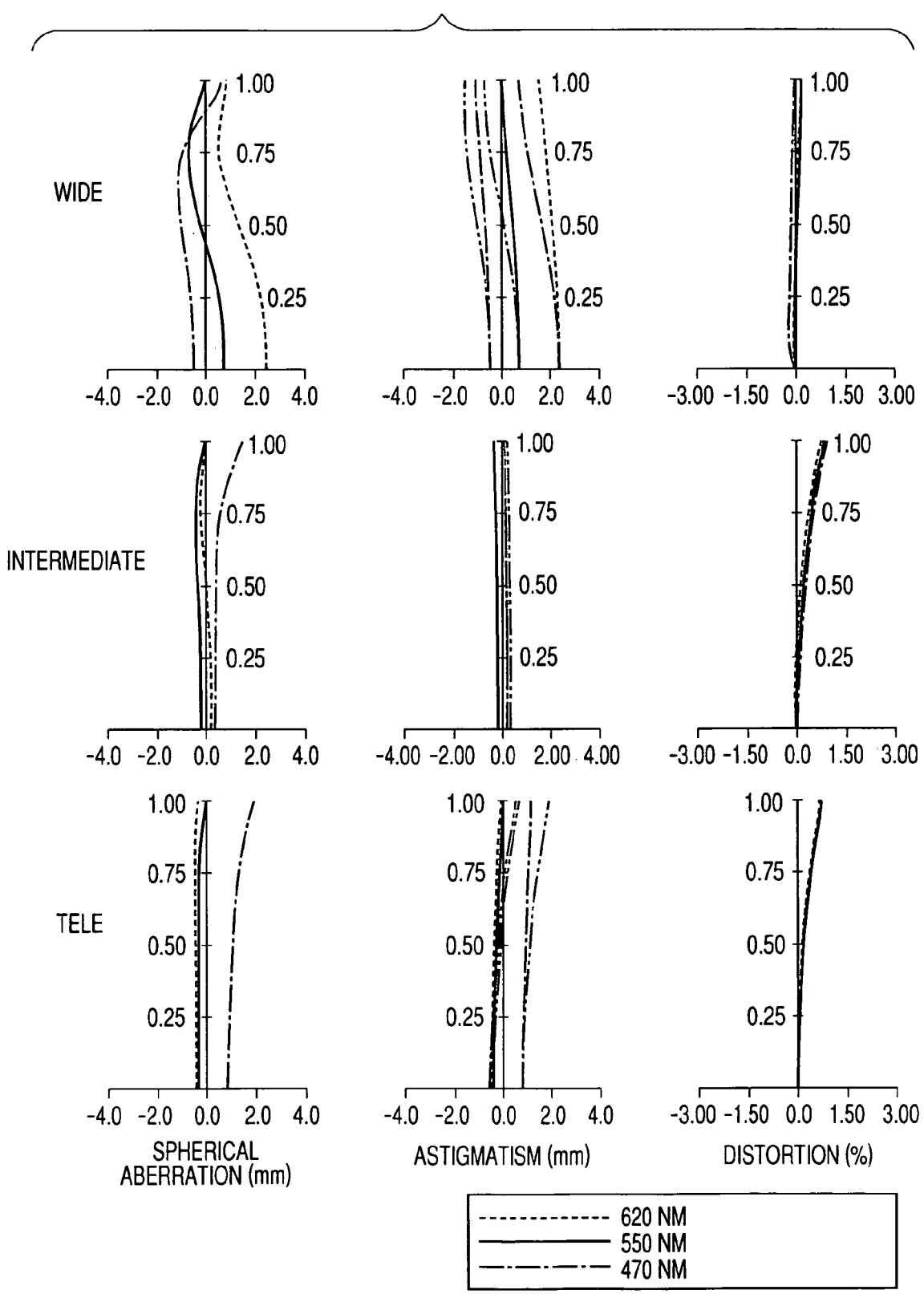
FIG. 8 shows the longitudinal aberrations of second Numerical Embodiment of the present invention.

Also, FIG. 8 shows the longitudinal aberrations in the present second Numerical Embodiment. In FIG. 8, in succession from above, the longitudinal aberrations at a wide angle position (focal length of 74 mm), a middle position (focal length of 107.5 mm) and a telephoto position (focal length of 141 mm). The wavelengths of the evaluating light beams are 620 nm, 550 nm and 470 nm. It will be seen from this figure that good imaging is effected.

As described above, the zoom optical system according to each of the foregoing embodiments is a zoom optical system which secures a sufficient space for inserting a color synthesizing member or the like thereinto, is excellent in telecentricity on the object side, and is excellent in the invariability of the positions of the object surface, the image plane and the exit pupil relative to the variation of the focal length.

Accordingly, if this zoom optical system is disposed on the object surface side of the projection optical system described in first Embodiment, it will be possible to realize a projection optical system and an image projecting apparatus which are low sensitivity to a manufacturing error, and have a wide angle of field and yet, can correct aberrations well and have a great amount of image plane movement.

While in the foregoing first and second Embodiments, description has been made of a zoom optical system in which the diameter of the exit pupil differs between in the Y-axis direction and in the X-axis direction, the present invention can also be applied to a zoom optical system having an exit pupil of which the diameter is equal in the two directions.

Here, the present invention is applicable also to a magnification length measuring machine. Also, while in the foregoing embodiments, description has been made of a zoom optical system in which the reduction side is the object side, and the magnification side is the image side, the present invention can also be applied to a zoom optical system in which the magnification side is the object side and the reduction side is the image side, and an optical apparatus using the same. The present invention can also be applied, for example, to an exposing apparatus (if the reduction side is telecentric, the size of the image will not change even if the in-focus position of the reduction side object deviates a little), or a compact image pickup lens having a front stop (having a stop more adjacent to the magnification side than in a zoom optical system).

Further, a diffraction grating may be provided on a lens surface to thereby obtain optical power and also, correct chromatic aberration.

According to the present embodiment, there can be realized a zoom optical system which secures a sufficient back focus and has a great numerical aperture and is bright, and further is excellent in telecentricity on the object side, and is also excellent in the invariability of the positions of the object surface, the image plane and the exit pupil relative to the variation of the focal length, and moreover is compact.

This application claims priority from Japanese Patent Application No. 2004-261719 filed on Sep. 8, 2004, which is hereby incorporated by reference herein.

What is claimed is:

1. A zoom optical system, comprising, in order from a reduction side to a magnification side:
    a first lens unit having positive optical power;
    a second lens unit having positive optical power;
    a third lens unit having positive optical power; and
    a fourth lens unit having negative optical power;
    wherein intervals between adjacent ones of said first, second, third and fourth lens units are varied during zooming, and in an entire zooming range, an magnification side conjugate position relative to a reduction side conjugate position, and the position of a pupil of said zoom optical system relative to the reduction side conjugate position are substantially immovable.

2. A zoom optical system according to claim 1, wherein said pupil is located outside the zoom optical system.

3. A zoom optical system according to claim 2, wherein said pupil is located more adjacent to said magnification conjugate side than the zoom optical system.

4. A zoom optical system according to claim 1, wherein during zooming from a wide angle end to a telephoto end, an interval between said first lens unit and one of said lens units which is on the most magnification side is increased.

5. A zoom optical system according to claim 1, wherein during zooming from a wide angle end to a telephoto end, one of said plurality of lens units which is on the most magnification side is moved toward said magnification side.

6. A zoom optical system according to claim 1, wherein the position of said first lens unit at a telephoto end is nearer to a conjugate point on the reduction side than the position of said first lens unit at a wide angle end is.

7. A zoom optical system according to claim 1, wherein the position of one of said plurality of lens units at a telephoto end which is on the most magnification side is nearer to a conjugate point on the magnification side than the position of said lens unit on the most magnification side at a wide angle end is.

8. A zoom optical system according to claim 1, wherein an interval between said first lens unit and said second lens unit at a telephoto end is narrower than an interval between said first lens unit and said second lens unit at a wide angle end, and an interval between said third lens unit and said fourth lens unit at the telephoto end is narrower than an interval between said third lens unit and said fourth lens unit at the wide angle end.

9. A zoom optical system according to claim 1, wherein a synthesized optical power of said first lens unit and said second lens unit, a synthesized optical power of said second lens unit and said third lens unit in said entire zooming range, and a synthesized optical power of said third lens unit and said fourth lens unit are positive in said entire zooming range.

10. A zoom optical system according to claim 1, wherein a substantially planar image located at said reduction conjugate position is formed on the curved surface located at said magnification side conjugate position.

11. A zoom optical system according to claim 1, wherein said reduction conjugate side is substantially telecentric, and in said entire zooming range, a distance from an image side principal point to said pupil is substantially equal to a focal length of said zoom optical system.

12. A zoom optical system according to claim 1, wherein in said entire zooming range, a distance from said reduction conjugate side principal point to said magnification conjugate side principal point is substantially equal to $$E-fz-fz(x'+fz)/x',$$

where E represents a distance from said reduction side conjugate position to said magnification side conjugate position, fz represents a focal length of said zoom optical system, and x' represents a distance from said pupil to said magnification side conjugate position.

13. A zoom optical system according to claim 1, wherein in said entire zooming range, a distance from said fourth lens unit to said pupil is longer than ½ of the minimum diameter of said pupil.

14. A projection optical system, comprising:
    a zoom optical system according to claim 1, wherein a beam from an original disposed at said reduction side conjugate position is projected onto a surface to be projected.

15. A projection optical system, comprising:
    a zoom optical system according to claim 1;
    a reflecting member disposed substantially at the position of said pupil for reflecting light from said zoom optical system; and
    a reflecting optical system including a plurality of reflecting surfaces for successively reflecting the light from said reflecting member;
    wherein a beam incident from the original disposed at said reduction side conjugate position onto said zoom optical system is projected onto a surface to be projected by said reflecting optical system, and the reflecting member is rotated, whereby the projected image projected onto said surface to be projected is moved on the surface to be projected.

16. A projection optical system according to claim 15, wherein said reflecting optical system includes a plurality of non-rotation symmetrical reflecting surfaces.

17. A projection optical system according to claim 15, wherein an intermediate image of said original is formed in the interior of said reflecting optical system.

18. A projection optical system according to claim 15, further comprising:
    at least one refractive optical element disposed between said reflecting optical system and said surface to be projected.

19. A projection optical system according to claim 18, wherein said at least one refractive optical element includes a cemented lens comprising a positive lens and a negative lens.

20. An image projecting apparatus, comprising:
    a projection optical system according to claim 15; and
    an image forming element for forming said original.

21. An image projecting apparatus according to claim 20, wherein in said entire zooming range, a distance from said reduction side conjugate position to said first lens unit is three times or more as great as the maximum height of said original.

22. An image projecting system, comprising:
    an image projecting apparatus according to claim 20; and
    an image information providing apparatus for providing said image projecting apparatus with image information for forming said original.

23. An optical apparatus having a zoom optical system according to claim 1.

* * * * *